United States Patent
Heishi et al.

(10) Patent No.: US 6,490,673 B1
(45) Date of Patent: Dec. 3, 2002

(54) PROCESSOR, COMPILING APPARATUS, AND COMPILE PROGRAM RECORDED ON A RECORDING MEDIUM

(75) Inventors: Taketo Heishi, Osaka (JP); Kensuke Odani, Kyoto (JP)

(73) Assignee: Matsushita Electric Industrial Co., LTD, Osaku-fu (JP)

(*) Notice: Subject to any disclaimer, the term of this patent is extended or adjusted under 35 U.S.C. 154(b) by 0 days.

(21) Appl. No.: 09/447,083

(22) Filed: Nov. 22, 1999

(30) Foreign Application Priority Data

Nov. 27, 1998 (JP) .............................. 10-337186

(51) Int. Cl.[7] .................................................. G06F 9/30
(52) U.S. Cl. ........................ 712/213; 717/120; 717/140; 714/38
(58) Field of Search .............................. 714/38, 9, 10; 717/3, 4, 5, 7, 11, 120, 140; 712/200, 203, 213

(56) References Cited

U.S. PATENT DOCUMENTS 5,596,732 A * 1/1997 Hosoi .......................... 395/709
5,732,234 A * 3/1998 Vassiliadis et al. .......... 712/200
6,044,450 A * 3/2000 Tsushima et al. ............. 712/24

FOREIGN PATENT DOCUMENTS

JP 9274612 10/1997

* cited by examiner

Primary Examiner—James P. Trammell
Assistant Examiner—Pierre E. Elisca
(74) Attorney, Agent, or Firm—Price and Gess

(57) ABSTRACT

Each of registers R0 to R31 is divided into the upper 32-bit area and the lower 32-bit area. A register writing control unit 431 outputs information to the selectors 4321 and 4322 on the registers and the locations (upper and lower areas) in which data is written by the instructions that have issued in one cycle. Each of the selectors 4321 and 4322 selects one out of pieces of data that have been output from first, second, and third arithmetic operation units 44, 45, and 46 and writes the selected data in the upper or lower area in one register. A dependency analysis unit 110 in a compiling apparatus considers the upper and lower registers in one 64-bit register as separate resources, analyzes the data dependency relations between the instructions, and generates a dependency graph that indicates the data dependency relations. A instruction rearrangement unit 111 rearranges the instructions and generates execution codes using the dependency graph.

20 Claims, 27 Drawing Sheets

FIG. 18

| instruction | T100 reference storage resource table | | | | | | | | |
|---|---|---|---|---|---|---|---|---|---|
| | type | | | | | | | | |
| | reference | | | | store | | | | |
| | Rn | | Rm | | Rn | | Rm | | |
| | upper | lower | upper | lower | upper | lower | upper | lower | |
| | case 1 | case 2 | case 3 | case 4 | case 5 | case 6 | case 7 | case 8 | |
| mov Rn, Rm | × | ○ | × | × | × | × | × | ○ | ... |
| add Rn, Rm | × | ○ | × | ○ | × | × | × | ○ | ... |
| vchng Rn, Rm | ○ | ○ | × | × | × | × | ○ | ○ | ... |
| vaddw Rn, Rm | ○ | ○ | ○ | ○ | × | × | ○ | ○ | ... |
| vadsbw Rn, Rm | ○ | ○ | ○ | ○ | ○ | ○ | ○ | ○ | ... |
| ... | | | | | | | | | |

PROCESSOR, COMPILING APPARATUS, AND COMPILE PROGRAM RECORDED ON A RECORDING MEDIUM

This application is based on an application Ser. No. 10-337186 filed in Japan, the content of which is hereby incorporated by reference.

BACKGROUND OF THE INVENTION

(1) Field of the Invention

The present invention relates to a processor, compiling apparatus, and compile program recorded on a recording medium, and especially relates to technologies of reducing the number of execute cycles in parallel processing by the processor.

(2) Description of the Related Art

As apparatus with built-in microprocessors have improved functions and speeds, a microprocessor (referred to a "processor" in this specification) with more improved processing performance has been required.

For improved throughput of a plurality of instructions on a processor, the pipeline control is adopted. The pipeline control will be described below. An instruction is divided into a plurality of unit instructions that are to be continuously executed. The process of executing one instruction is also divided into a plurality of continuous smaller processes (referred to "stages" in this specification). The processor has executing units (hardware) which each corresponding to different stages. Each of the unit instructions is continuously executed by a different executing unit at a different stage to execute the instruction. When two instructions are continuously executed, each of the unit instructions of the second instruction is executed by a different executing unit at a different stage one stage behind the first instruction. By doing so, a plurality of instructions are executed in parallel.

For more improved performance, parallel processing is adopted at individual instruction level. The parallel processing at instruction level is to simultaneously execute a plurality of instructions in one machine cycle. The parallel processing at instruction level is executed by dynamic scheduling and static scheduling.

One representative example of the parallel processing at instruction level by dynamic scheduling is the superscalar system. According to the superscalar system, the operations described below are executed when a plurality of instructions are executed on a processor. The instruction codes are decoded. Then, an instruction issuing control unit (hardware) of the processor analyzes the dependency relations of the plurality of instructions using the decoded instruction codes and judges whether the instructions can be executed in parallel. The processor executes instructions in parallel that can be executed in parallel.

On the other hand, one representative example of the static scheduling is the VLIW (Very Long Instruction Word) system. According to the VLIW system, the operations described below are executed. At the time of the generation of the execution code, the dependency relations among the plurality of instructions are analyzed using the compiler and the like. According to the analysis, instruction codes are moved to generate an instruction stream that is more efficiently executed. Generally, a plurality of instructions that can be simultaneously executed are described in an instruction supply unit of fixed length (referred to a "packet" in this specification) in the VLIW system.

In each of the scheduling systems, hazard due to the dependency relations of data is avoided at the instruction parallel processing. More specifically, it is controlled so that an instruction to store a value in a register and an instruction to refer to the stored value are not issued in the same cycle according to the information on the names of registers to which is referred to for the data and in which the data is stored. According to the dynamic scheduling, the instruction issuing control unit controls so that the two instructions are not executed in parallel but executed in serial. On the other hand, according to the static scheduling, the compiler schedules so that a group of instructions that are issued in the same cycle does not include instructions that have data dependency relations at the time of compiling.

Recently, an increasing number of processors have adopted media processing instructions that deal with data whose size is larger than that of data dealt with by basic instructions as well as basic instructions for signal processing performance improvement. In the media processing instruction, a plurality of pieces of data are stored in a register whose length is larger than the length of registers used for basic instructions. The plurality of pieces of data are processed in parallel for the improvement of the signal processing performance. Some processors adopting the media processing instruction are not equipped with registers specifically for the media processing instruction. Instead, in those processors, the registers are shared for the basic instruction and the media processing instruction and data is written in part of the registers for the basic instruction.

When the dependency relations among a plurality of instructions are analyzed in those processors by referring to the register names shown in the instruction codes according to the instruction issuing control method that has been described, an instruction to update the upper half of one register and an instruction to update the lower half of the register are executed in serial since the same register name in the instruction codes is considered the data dependency relation between the instructions This is problematic. Here, the data dependency relation refers to the dependency relation between an instruction to store data in a resource and another instruction to refer to the stored data.

SUMMARY OF THE INVENTION

It is accordingly the object of the present invention to provide a processor, a compiling apparatus, and a compile program recorded on a recording medium that reduce the number of execute cycles when parallel processing is performed in a processor that execute a plurality of instructions in one cycle.

The above-mentioned object may be achieved by a processor that processes a plurality of instructions in one cycle, the processor may include: A) a register; B) an instruction fetching unit for fetching the plurality of instructions that include at least a first instruction and a second instruction from an external program, the first instruction including a first access indication for accessing a first area, which is at least part of an area in the register, the second instruction including a second access indication for accessing a second area, which is at least part of the area in the register, wherein when the first area is a whole of the register, the second area is the part of the register, when the second area is the whole of the register, the first area is the part of the register, and at least one of the first and second access indications is for storing data in at least the part of the register; C) a decoding unit for decoding each of the fetched instructions and outputting at least decoded information on the register and on areas in the register in one cycle, the decoded information including at least information on the register and on the first and second areas; and D) an access unit for accessing the first and second areas according to the decoded information in one cycle.

In the processor, an instruction to access the first-part in one register and another instruction to access the second part in the same register in a program can be executed in one cycle. As a result, the number of execute cycles is reduced compared with a conventional processor.

The above-mentioned object may be also achieved by the processor, wherein the first area, which is an object of the first access indication, and the second area, which is an object of the second access indication, are parts of the register and have no overlap, the first instruction includes an indication for storing data in the first area and the second instruction includes an indication for referring to data in the second area, and the access unit stores data in the first area and refers to data in the second area in one cycle.

In the processor, an instruction to store data in the first part of one register and another instruction to refer to data in the second part in the same register can be executed in one cycle. As a result, the number of execute cycles is reduced compared with a conventional processor.

The above-mentioned object may be also achieved by the processor, wherein the first area, which is an object of the first access indication, and the second area, which is an object of the second access indication, are parts of the area in the register and have no overlap, the first instruction includes an indication for storing data in the first area and the second instruction includes an indication for storing data in the second area, and the access unit stores data in the first and second areas in one cycle.

In the processor, an instruction to store data in the first part of one register and another instruction to store data in the second part in the same register can be executed in one cycle. As a result, the number of execute cycles is reduced compared with a conventional processor.

The above-mentioned object may be also achieved by the processor, wherein the first area, which is an object of the first access indication, and the second area, which is an object of the second access indication, have an overlap, which is a third area, the first instruction includes an indication for storing data in the first area and the second instruction includes an indication for storing data in the second area, and the access unit stores data in the first area excluding the third area, the second area excluding the third area, and the third area in one cycle.

In the processor, an instruction to store data in part of one register and another instruction to store data in part or the whole of the same register can be executed in one cycles As a result, the number of execute cycles is reduced compared with a conventional processor, in which data is written in one register only by one instruction in one cycle.

The above-mentioned object may be also achieved by the processor, wherein the decoding means may include: A) an instruction decoding unit for decoding a plurality of instructions of the fetched instructions and outputting at least decoded information on the register and on areas in the register in one cycle, the decoded information according to indications for decoding instructions, the instruction decoding unit for stopping decoding an instruction in the fetched instructions according to an indication for stopping decoding the instruction in one cycle, wherein the plurality of fetched instructions include at least the first and second instructions, and wherein the decoded information includes at least the information on the register and on the first and second areas; and B) an instruction issuance control unit for controlling the instruction decoding unit by outputting an indication for decoding an instruction for each of the fetched instructions in one cycle so that the instruction decoding unit decodes the fetched instructions, the instruction issuance control unit for controlling the instruction decoding unit by receiving the decoded information that includes at least the information on the register and on the first and second areas after the instruction decoding unit decodes the fetched instructions, by judging whether the first and second areas are the same area, and by outputting an indication for stopping decoding the second instruction to the instruction decoding unit when it is judged that the first and second areas are the same area so that the instruction decoding unit stops decoding the second instruction.

In the processor, when the same part of one register is accessed by two instructions, it is considered that there is no data dependency relations between the two instructions and the decoding of one of the instructions is stopped As a result, when different parts of one register are accessed by two instructions, the two instructions can be executed in one cycle. Accordingly, the possibility that two instructions are executed in parallel is enhanced, and the number of execute cycles is reduced compared with a conventional processor.

The above-mentioned object may be also achieved by a compiling apparatus that generates object codes from a source program described in a high-level language, the compiling apparatus may include: A) a storage unit for storing the source program; B) an execution code generating unit for reading the source program from the storage unit and performing translation processing on the read source program to generate an executive program, the executive program including at least one executive instruction, the executive instructions including information on a register; C) an instruction scheduling unit for rearranging the executive instructions according to information included in the executive instructions on areas that are parts of an area in the register so that a plurality of executive instructions that are to be executed in parallel are adjacent to each other; and D) an object code generating unit for generating the object codes according to the rearranged executive instructions.

In the compiling apparatus, a plurality of executive instructions are rearranged in units of parts of registers that are to be accessed by the executive instructions. As a result, when object codes that have been output from the compiling apparatus are executed in the object processor, the possibility that a plurality of executive instructions are executed in parallel is enhanced, and the number of execute cycles is reduced. Accordingly, the compiling apparatus can generate execute codes that are executed in less number of execute cycles.

The above-mentioned object may be also achieved by the compiling apparatus, wherein the instruction scheduling unit includes: A) a dependency relation analysis unit for generating dependency relation information that indicates dependency relations between the executive instructions according to order in which the executive instructions are arranged and the information on the areas that are parts of the area in the register; B) an instruction rearrangement unit for determining groups containing at least one instructions that are to be executed in parallel according to the dependency relation information and rearranging the executive instructions; and C) an execution boundary adding unit for adding parallel execution information to each of the determined groups that indicates whether instructions are to be executed in parallel.

In the compiling apparatus, the data dependency relations between a plurality of executive instructions are analyzed, parallel execution information is added to for each group of instructions that are to be executed in parallel, and the executive instructions are rearranged in units of parts of registers that are to be accessed by the executive instructions. As a result, when object codes that have been output from the compiling apparatus are executed in the object processor, the processor easily detects groups of instructions that are executed in parallel using the parallel execution information, the possibility that a plurality of executive instructions are executed in parallel is enhanced, and the number of execute cycles is reduced. Accordingly, the compiling apparatus can generate execute codes that are executed in less number of execute cycles.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 18 shows an example of reference storage resource table;

DESCRIPTION OF THE PREFERRED EMBODIMENTS

A detailed explanation of a program execution system including a compiling apparatus and an application apparatus in which a processor is built will be given with reference to figures.

I. The First Embodiment

Figure 1:
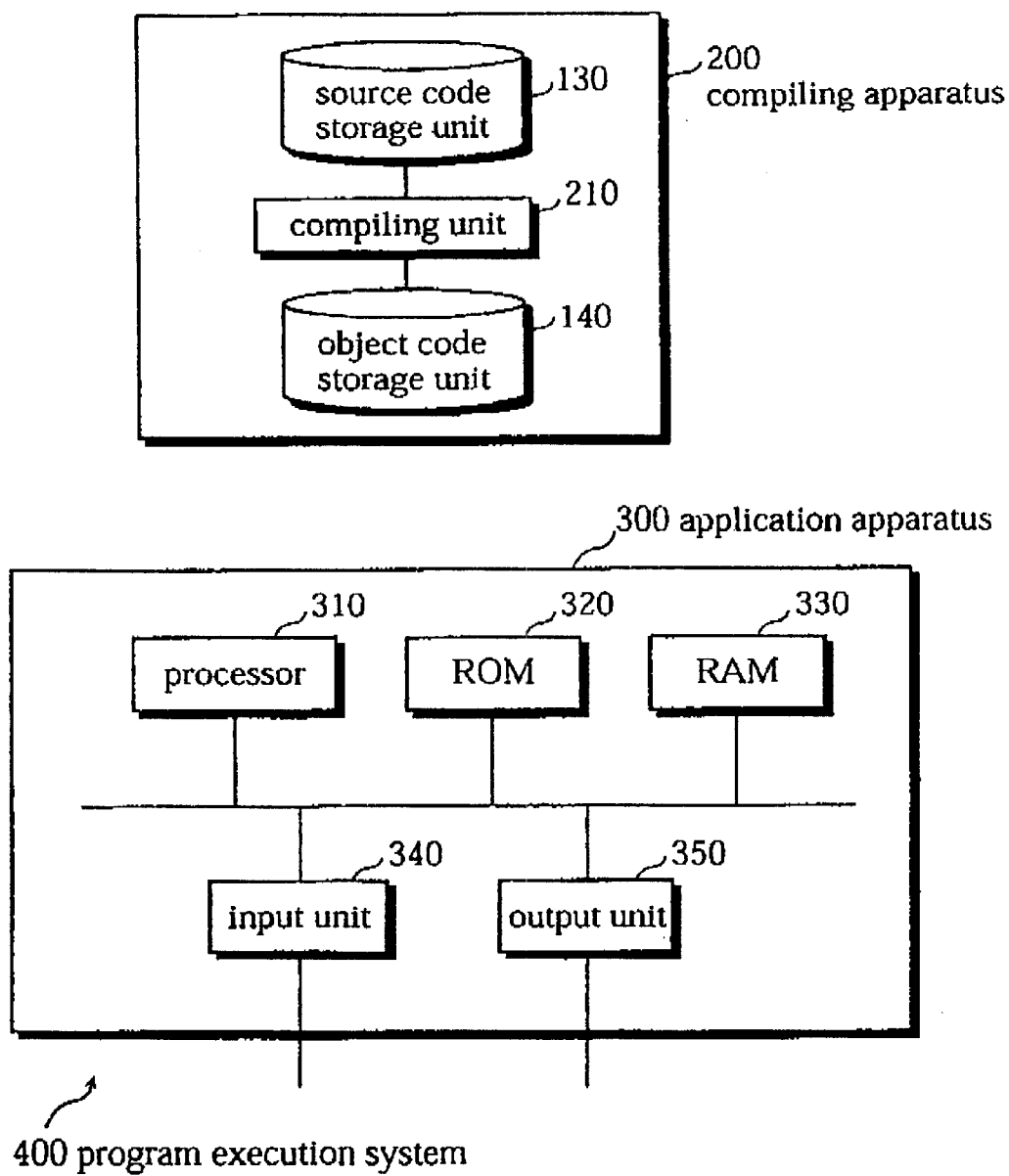
FIG. 1 is a block diagram showing the structure of a program execution system 400 according to the first embodiment of the present invention.

An explanation of a program execution system 400 as the first embodiment of the present invention will be given below. The program execution system 400 includes a compiling apparatus 200 and an application apparatus 300 as shown in FIG. 1.

The compiling apparatus 200 includes a source code storage unit 130, a compiling unit 210, and an object code storage unit 140. The compiling apparatus 200 compiles source codes that is a program stored in the source code storage unit 130, generates object codes, and writes the generated object codes into the object code storage unit 140. Here, the compiling includes parallel scheduling of instructions. In addition, the source codes are described in a high-level language.

The application apparatus 300 includes a processor 310, a ROM 320, a RAM 330, an input unit 340, and an output unit 350. The object codes that have been generated by the compiling apparatus 200 are stored in the RAM 330 in advance. The processor 310 reads and executes object codes stored in the RAM 330. The application apparatus 300 is an MPEG (Motion Picture Expert Group) decoder, for instance.

Here, an explanation of the processor 310 and the compiling apparatus 200 will be given. Note that the compiling apparatus 300 and the other elements than the processor 310 are not the theme of the present invention, so that no more detailed explanation of the compiling apparatus 300 and these elements will be given.

1. Processor 310

The processor 310 is supposed to execute object codes on which static parallel scheduling has been performed by the compiling apparatus.

Here, an explanation of the structures of instructions that are to be executed by the processor 310 will be given. Then, an explanation of the structure of and operations by the processor 310 will be given.

1.1. Instruction Format

An explanation of the structure of instructions that are decoded and executed by the processor 310 will be given below. Here, the instructions are object codes that are stored in the object code storage unit 140 (referred to as "instructions" in this specification).

Figure 2:
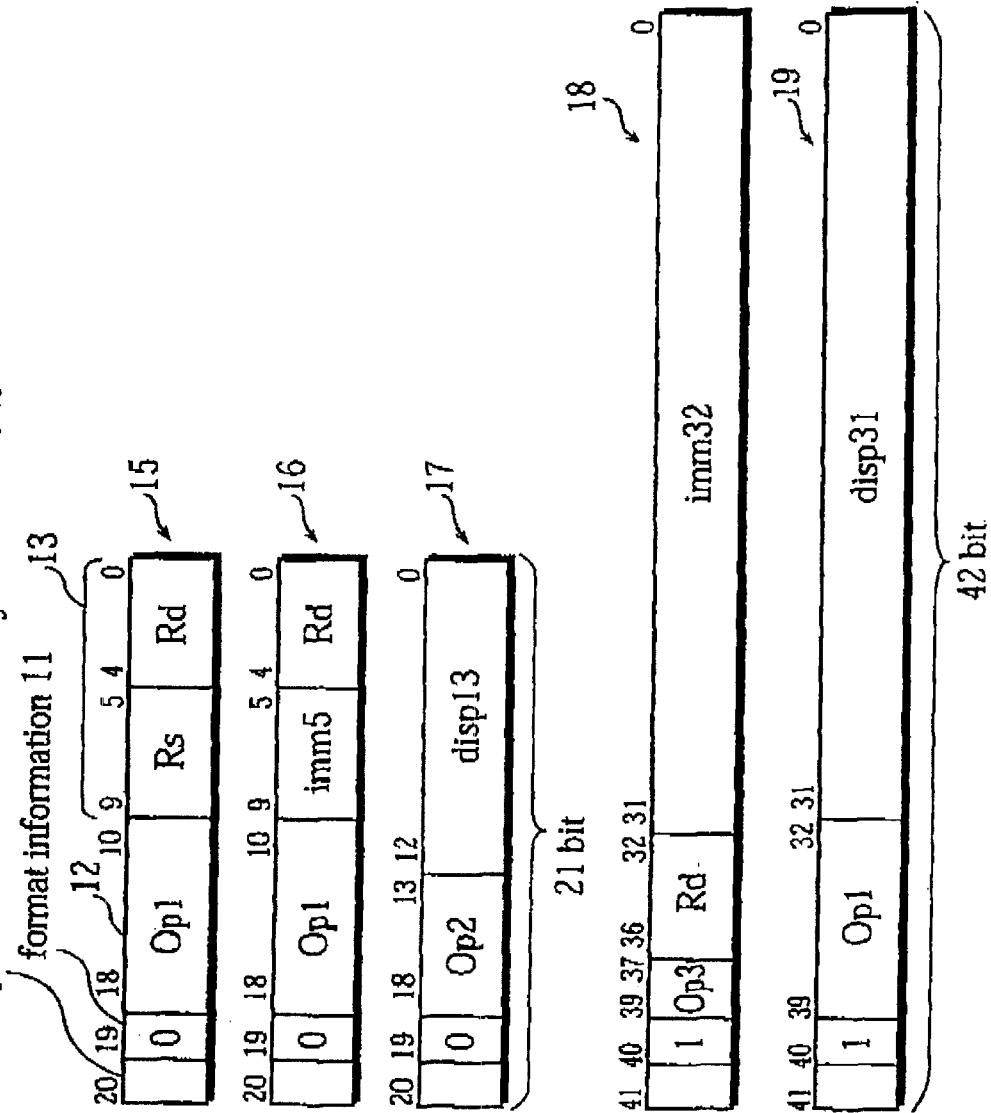
FIG. 2 shows the data structures of instructions that are executed by a processor 310 built in an application apparatus 300 in the program execution system 400.

FIG. 2 shows the format of instructions that the processor 310 decodes and executes. In FIG. 2, five instructions, instructions 15 to 19, are shown.

An instruction decoded and executed by the processor 310 is composed of one or two instruction elements (referred to as a "unit" in this specification). One unit is composed of 21 bits of data. There are two kinds of instruction format, a 21 bit instruction composed of one unit and a 42 bit instruction composed of two units. Instructions 15 to 17 in FIG. 2 are 21-bit instructions and instructions 18 and 19 are 42-bit instruction.

An instruction includes parallel execution boundary information 10, format information 11, an op code part 12, and an operand part 13.

The format information 11 is one bit of data and shows whether the instruction is a 21-bit instruction or a 42-bit instruction. When the format information 11 is "0", the instruction is a 21-bit instruction composed of one unit. On the other hand, when the format information 11 is "1", the instruction is a 42-bit instruction composed of two units, i.e., the combination of the consecutive two units.

The parallel execution boundary information 10 is one bit of data. The parallel execution boundary information 10 shows whether a boundary of parallel execution is between the instruction having the parallel execution boundary information 10 and the following instruction. More specifically, when the parallel execution boundary information 10 is "1", a parallel execution boundary is between the instruction and the following instruction. On the other hand, when the parallel execution boundary information 10 is "0", no parallel execution boundary is included. Note that a more detailed explanation of the use of the parallel execution boundary information 10 will be given later.

In the op code part 12 and the operand part 13, which are the other part of an instruction than the format information 11 and the parallel execution boundary information 10, the operation of the instruction is designated. For the operation designation, 19 bits of data is used for an 21-bit instruction and 40 bits of data for an 42-bit instruction.

More specifically, the fields indicated by the "Op1"s, "Op2", and "Op3" in the instructions 15 to 19 are op code parts, where op codes indicating the kinds of operation are designated. The fields indicated by the "Rs"s and "Rd"s are operand parts. In a field indicated by the "Rs", the register number of a register that is to be a source operand is designated. On the other hand, in a field indicated by the "Rd", the register number of a register that is to be a destination operand.

In addition, the fields indicated by the "imm5" and "imm32" in the instructions 16 and 18 are operand parts, where a 5-bit operation constant operand and a 32-bit operation constant operand are designated, respectively. The fields indicated by the "disp13" and "disp31" in the instructions 17 and 19 are operand parts, where a 13-bit displacement and a 31-bit displacement are designated, respectively.

While a transfer instruction and an arithmetical instruction that deal with a long constant such as a 32-bit constant, and a branch instruction that designates a large displacement are defined by 42-bit instructions, other instructions are defined by 21-bit instructions. Note that part of a long constant or displacement is located in the latter (second) one of the two units that compose a 42-bit instruction as shown in FIG. 2. No op code is located in the latter unit.

1.2. Overall Architecture

Here, an explanation of the overall architecture of the processor 310 will be given.

The processor 310 is supposed to execute object codes on which static parallel scheduling has been performed by the compiling apparatus. An explanation of the unit of instructions that are to be supplied to the processor 310 and the unit of instructions that are to be executed in the processor 310 will be given below with reference to FIG. 3.

An instruction of fixed length of 64 bits is supplied to the processor 310 in every cycle. In this specification, one unit of instruction supply is referred to a "packet" and one instruction supply unit includes three units. Note that three units correspond to 63 bits of data and the remaining one unit is not used.

Figure 3:
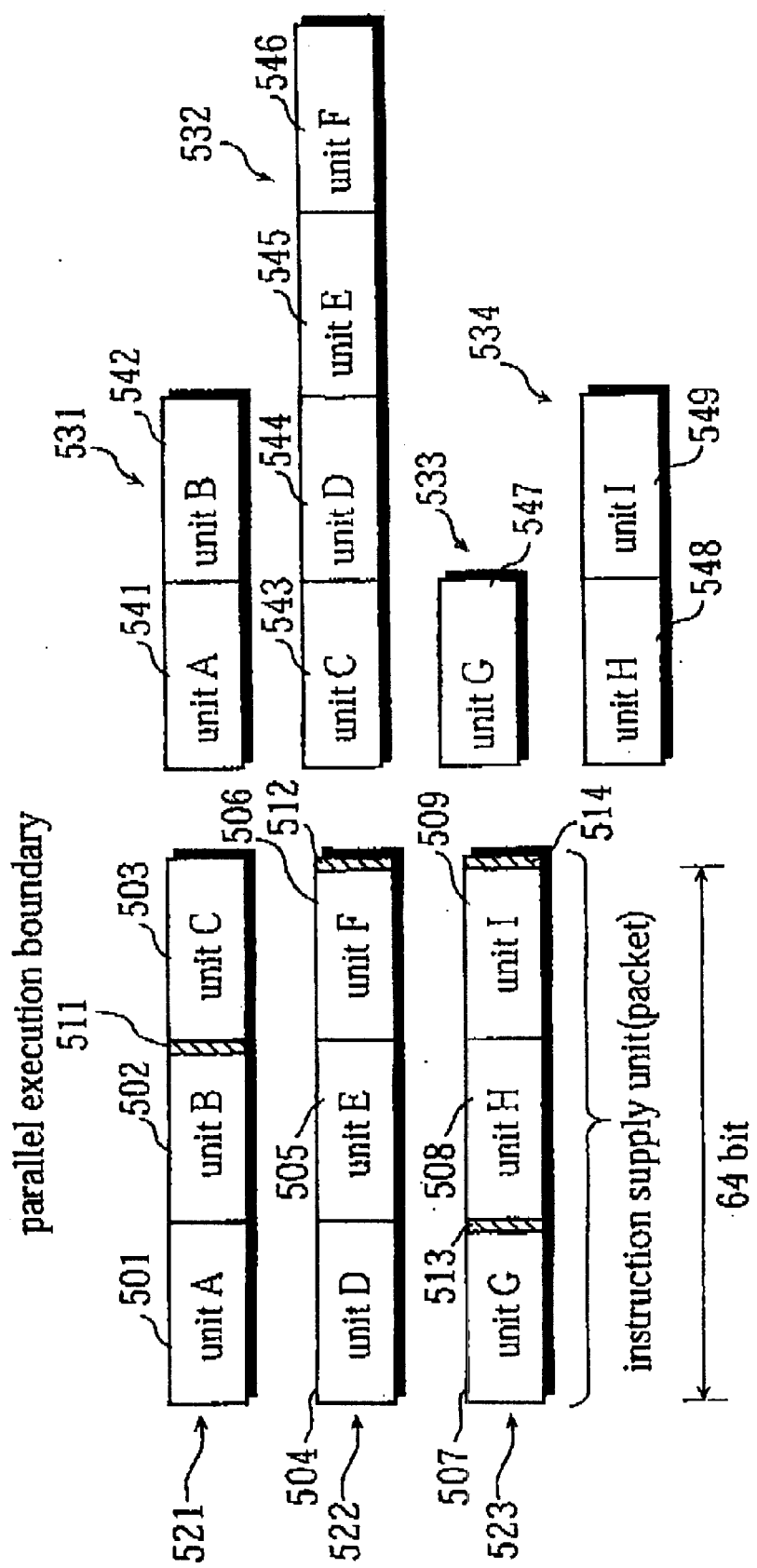
FIG. 3 shows examples of instruction supply unit and execution group in the processor 310.

Examples of instruction supply unit are shown in FIG. 3. In FIG. 3, the reference numbers 521, 522, and 523 indicate instruction supply units. The instruction supply unit 521 includes units A501, B502, and C503. The instruction supply unit 522 includes units D504, E505, and F506. The instruction supply unit 523 includes units G507, H508, and I509. The reference numbers 511, 512, 513, and 514 indicate parallel execution boundaries.

In the processor 310, the instructions indicated by the units between parallel execution boundaries in one cycle. Here, at least one instruction that are simultaneously executed are referred to an "execution group". In each cycle, a group of instructions whose last instruction has "1" as the value of the parallel execution boundary information are executed in parallel.

FIG. 3 shows examples of execution group. In FIG. 3, reference numbers 531, 532, 533, and 534 indicate execution groups. The execution group 531 includes the units A541 and B542. The execution group 532 includes the units C543, D544, E545, and F546. The execution group 533 includes the units G547. The execution group 534 includes the units H548 and I549.

The instructions indicated by the units A541 and B542 are executed in parallel. Then, the instructions indicated by the units C543, D544, E545, and F546 are executed in parallel. Next, the instruction indicated by the unit G547 is executed, and the instructions indicated by the units H548 and I549 are executed in parallel.

The units that have been supplied to the processor 310 and have not been executed are stored in an instruction buffer and are to be executed in following cycles.

In other words, in the architecture of the processor 310, instructions are supplied in packet units of fixed length in advance and appropriate number of units are executed in each cycle according to the information indicating boundaries of parallel execution that have been statically obtained. As a result, non-operation instructions in a processor in the VLIW system do not appear, leading to code size reduction.

In addition to basic instructions such as "add" instruction (addition) and "ld" instruction (loading from a memory), the processor 310 executes SIMD (Single Instruction stream Multiple Data stream) instructions for performing operations in the SIMD type. Data parallel is realized by the SIMD instruction, improving signal processing performance. While a basic instruction deals with 32-bit data, an SIMD instruction deals with a 64-bit data. Note that no register is exclusively dedicated to SIMD instructions. 64-bit general purpose registers are shared by basic instructions and SIMD instruction. At the time of execution of a basic instruction, only lower 32 bits of a general purpose register is used.

The SIMD instruction includes data parallel arithmetical instruction such as "vaddw" instruction (including two addition of 32-bit data) and "vaddh" instruction (including four addition of 16-bit data), data transfer such as "vchng" instruction (for changing places of the upper and lower 32 bits of a 64-bit register), and data recombination.

1.3. Hardware Structure of Processor 310

Figure 4:
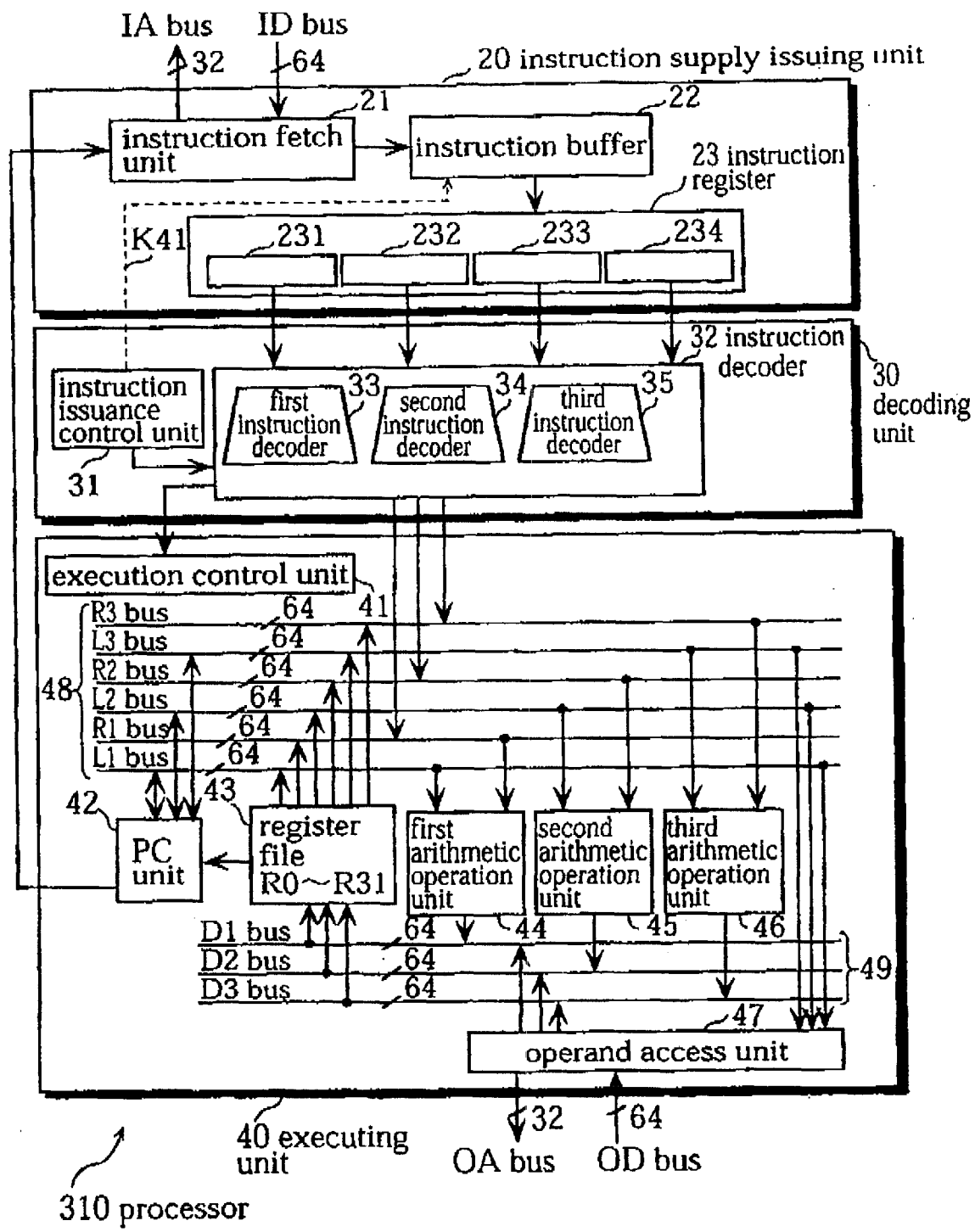
FIG. 4 is a block diagram showing the hardware structure of the processor 310.

An explanation of the hardware structure of the processor 310 will be given with reference to FIG. 4. FIG. 4 is a block diagram showing the hardware structure of the processor 310.

The processor 310 executes up to three instructions in one cycle in parallel. The processor 310 includes an instruction supply issuing unit 20, a decoding unit 30, and an executing unit 40.

1.3.1. Instruction Supply Issuing Unit 20

The instruction supply issuing unit 20 includes an instruction fetch unit 21, an instruction buffer 22, and an instruction register 23. The instruction supply issuing unit 20 reads a group of instructions from an external memory (not illustrated) (from the RAM 330 in an application apparatus 300) and supplies the read instructions to the decoding unit 30.

(1) Instruction Fetch Unit 21

The instruction fetch unit 21 is connected to the external memory via a 32-bit IA (instruction address) bus and a 64-bit ID (instruction data) bus.

The instruction fetch unit 21 receives an address from a PC (Program Counter) unit 42. Then, the instruction fetch unit 21 fetches a group of units that are stored in the location indicated by the address via the IA and ID buses. Here, the unit group includes three units. Next, the instruction fetch unit 21 adds one-bit of information to the most significant part of the fetched unit group to generate a 64-bit of packet, and supplies the generated packet to the instruction buffer 22. Note that the one-bit of information that has been added to the most significant part of the 64-bit packet is not to be used.

(2) Instruction Buffer 22

The instruction buffer 22 includes two 63-bit of buffers. The instruction buffer 22 receives the supply of a packet and stores 63-bit data of the packet except for the most significant one-bit data. Having two 63-bit buffers, the instruction buffer 22 stores up to six units. The instruction buffer 22 has a queue structure, so that the units stored in the instruction buffer 22 are output to appropriate registers in the order of storage.

Meanwhile, the instruction buffer 22 is connected to an instruction issuance control unit 31 of the decoding unit 30, which will be described later, via a control signal line K41 and receives information indicating the remaining units that have not issued from the instruction issuance control unit 31. When receiving the information, the instruction buffer 22 outputs the stored units including the remaining units indicated by the information to appropriate registers in the instruction register 23 in the order of storage.

(3) Instruction Register 23

The instruction register 23 includes instruction registers A231, B232, C233, and D234 as shown in FIG. 4. The instruction registers A231, B232, C233, and D234 are 21-bit registers. The instruction registers A231, B232, C233, and D234 store units transferred from the instruction buffer 22 in this order.

Figure 5:
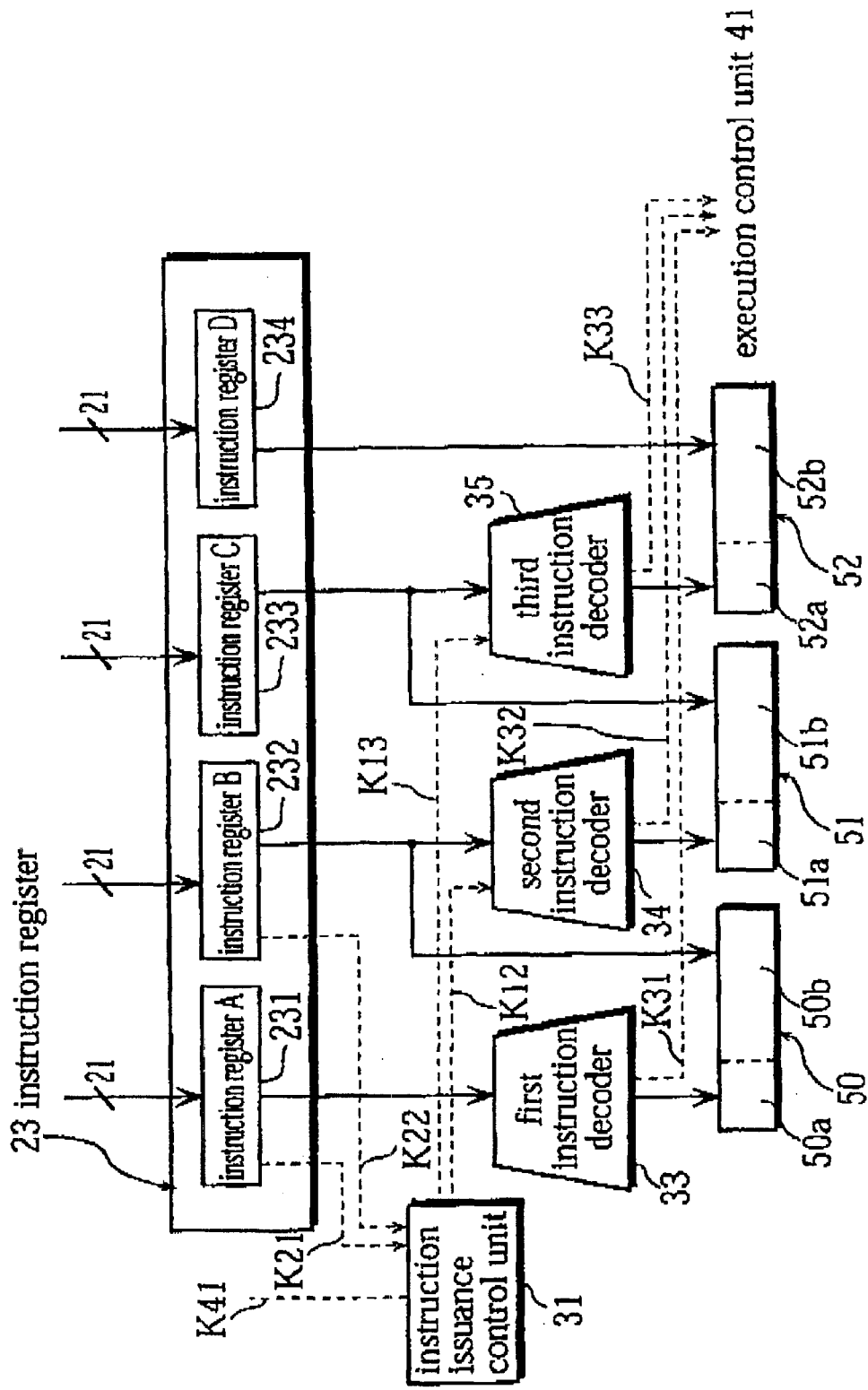
FIG. 5 is a block diagram showing the structure of an instruction register 23 and the peripheral elements.

FIG. 5 is a block diagram showing the structure of an instruction register 23 and the peripheral elements. In FIG. 5, the dotted lines indicated by reference numbers K12, K13, K21, K22, K31, K32, K33, and K41 indicate the control signal lines. As shown in FIG. 5, the instruction registers A231 and B232 are connected to the instruction issuance control unit 31, which will be described later, via the control signal lines K21 and K22, respectively.

1.3.2. Decoding Unit 30

The decoding unit 30 includes the instruction issuance control unit 31, an instruction decoder 32 as shown in FIG. 4. The decoding unit 30 decodes the instructions stored in the instruction register 23 and outputs the decoding results and control signals to the executing unit 40 according to the decoding results.

(1) Instruction issuance control unit 31

For the units that are stored in two registers (the instruction registers A231 and B232) included in the instruction register 23, the instruction issuance control unit 31 refers to the parallel execution boundary information and the format information of the units to control so that the two units are dealt with as two instructions or as one instruction. For units that dome after the parallel execution boundaries, the instruction issuance control unit 31 controls so that the issuance of the units are nullified.

Figure 6:
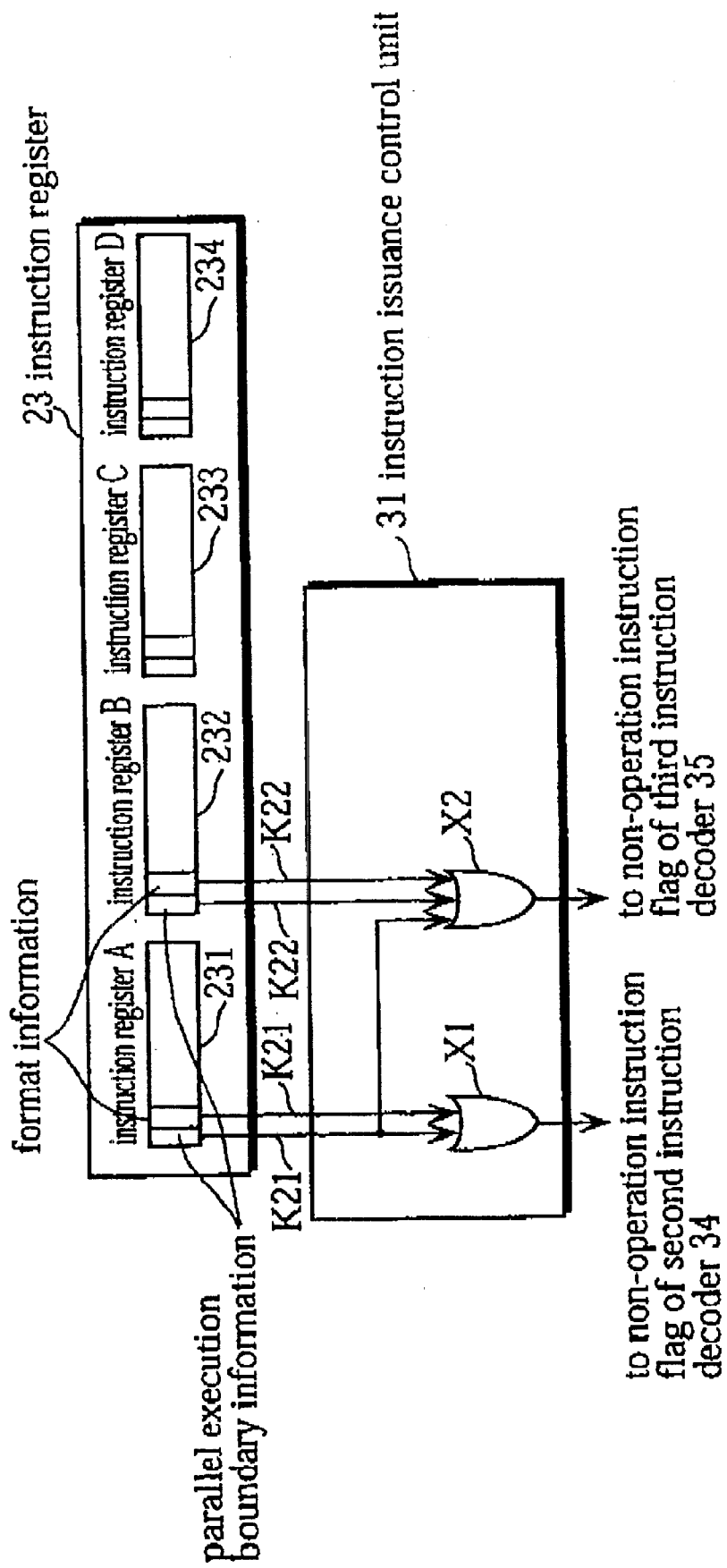
FIG. 6 is a block diagram showing the structure of an instruction issuance control unit 31 and the peripheral elements.

More specifically, the instruction issuance control unit 31 includes OR circuits X1 and X2 as shown in FIG. 6. The OR circuit X1 is connected to the instruction register A231 via the control signal line K21. On the other hand, the OR circuit X2 is connected to the instruction register A231 via the control signal line K21 and to the instruction register B232 via the control signal line K22.

The OR circuit X1 obtains the parallel execution boundary information and the format information in the unit that is stored in the instruction register A231 via the control signal line K21, and executes OR operation on the obtained parallel execution boundary information and format information to generate a non-operation instruction flag. Here, the non-operation instruction flag is a one-bit data. The non-operation instruction flag has a value of "0" or "1". The OR circuit X1 outputs the generated non-operation instruction flag to a second instruction decoder 34.

The OR circuit X2 obtains the parallel execution boundary information in the unit that is stored in the instruction register A231 via the control signal line K21 and the parallel execution boundary information and the format information in the unit that is stored in the instruction register 5232 via the control signal line K22. The OR circuit X2 executes an OR operation on the parallel execution boundary information in the unit stored in the instruction register A231, the parallel execution boundary information in the unit store in the instruction register B232, and the format information in the unit stored in the instruction register B232 to generate a non-operation instruction flag. Here, the non-operation instruction flag is an one-bit data and has a value of "0" or "1". The OR circuit X2 outputs the generated non-instruction flag to a third instruction decoder 35.

As has been described, the instruction issuance control unit 31 sets a non-operation instruction flag by referring to a parallel execution boundary information and format information as necessary. By doing so, decoding as instruction is nullified in each of the instruction decoders.

The instruction issuance control unit 31 determines which of the units stored in the instruction register 23 are to be issued in one cycle using the parallel execution boundary information in each of the unit and transfers the information indicating the units that have not been issued to the instruction buffer 22 via the control signal line K41.

As shown in FIG. 5, three instruction decoders are included and the instruction registers A231, B232, and C233 correspond to the instruction decoders 33, 34, and 35, respectively. As a result, only the units stored in the instruction registers A231, B232, and C233 can be decoded as instruction. Under the circumstances, the instruction issuance control unit 31 refers to the information in the units and nullifies the decoding as instruction of a unit that is the second unit of a 42-bit instruction and a unit that is not to be issued. A unit that is the second unit of a 42-bit instruction is directly output as part of a constant operand of the instruction including the next previous unit.

Here, an explanation of operations by the instruction issuance control unit 31 will be given using specific examples.

Figure 7:
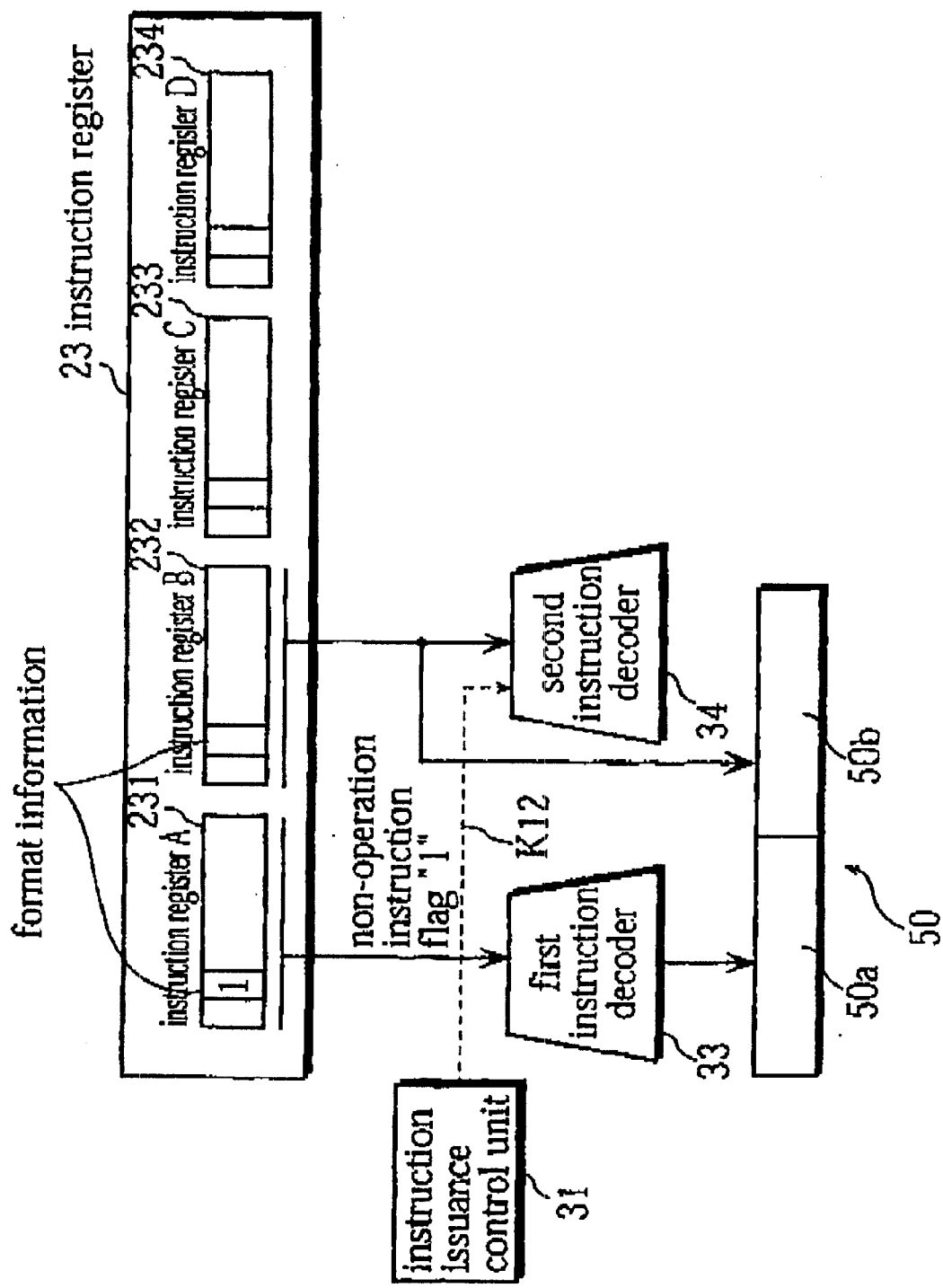
FIG. 7 shows operations by the instruction issuance control unit 31 and the peripheral elements in the processor 310 when the format information of the unit (a unit 1) of an instruction register A231 is "1"

When the format information of the unit in the instruction register A231 (the unit 1) is "1" as shown in FIG. 7, the unit 1 and the unit in the instruction register B232 (the unit 2) are connected to be a 42-bit instruction. For nullifying decoding as instruction of the unit 1, the instruction issuance control unit 31 outputs the non-operation instruction flag for which "1" has been set to the second instruction decoder 34 via the control signal line K12. Here, the second decoder 34 does not decode the unit 2. The unit 2 is output as part of the constant operand of the instruction that includes the unit 1.

Figure 8:
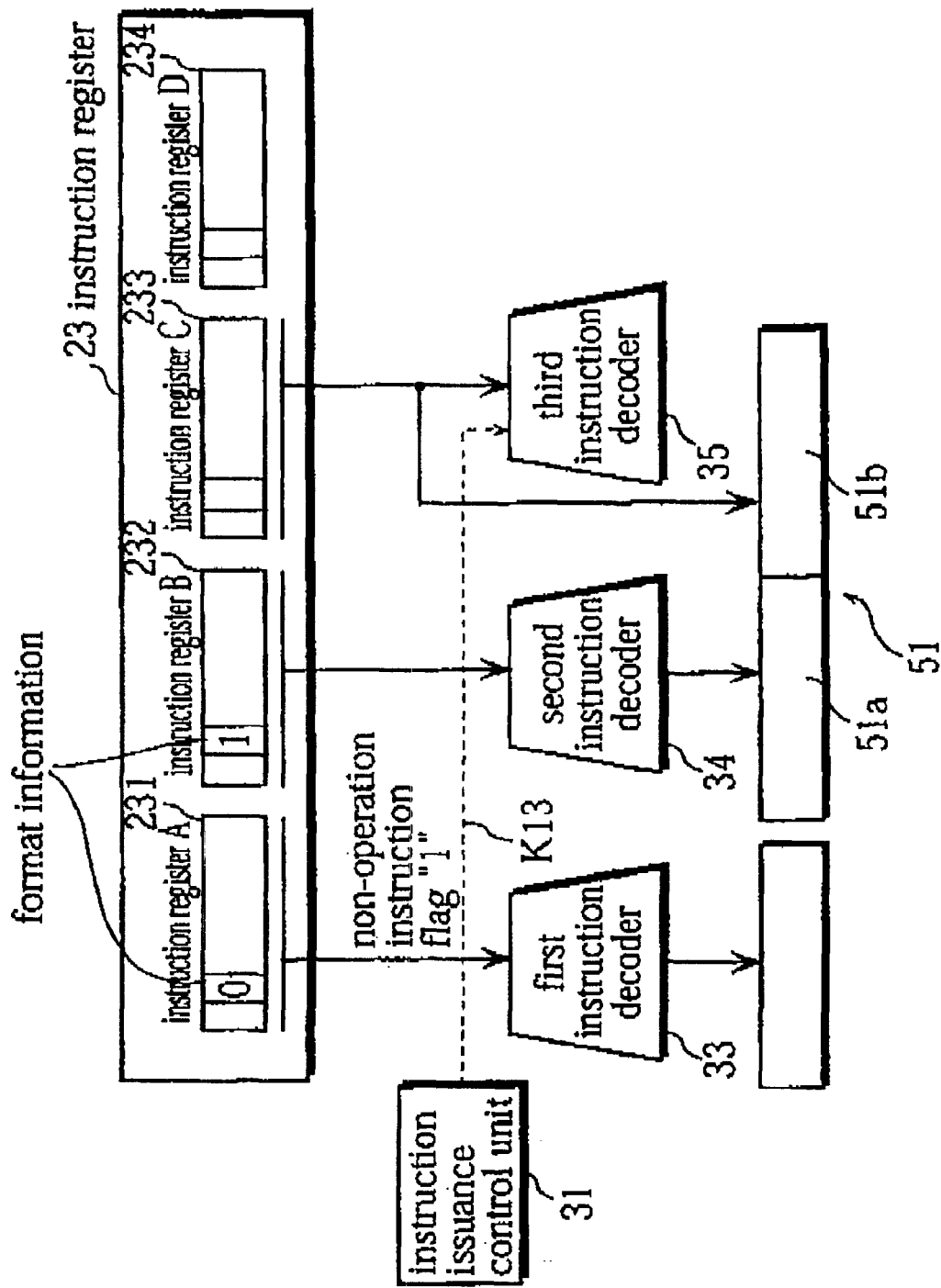
FIG. 8 shows operations by the instruction issuance control unit 31 and the peripheral elements in the processor 310 when the format information of the unit 1 of the instruction register A231 is "0" and the format information of a unit 2 of an instruction register B232 is "1"

On the other hand, when the format information of the unit 1 in the instruction register A231 is "0" and the format information of the unit 2 in the instruction register B232 is "1" as shown in FIG. 8, the unit 2 and the unit in the instruction register C233 (a unit 3) are connected to be a 42-bit instruction. For nullifying the decoding as instruction of the unit 3, the instruction issuance control unit 31 outputs the non-operation instruction flag for which "1" has been set to the third instruction decoder 35 via the control signal line K13. Here, the third instruction decoder 35 does not decode the unit 3. The unit 3 is output as part of the constant operand 51 of the instruction that includes the unit 2.

As has been described, the instruction issuance control unit 31 sets a non-operation flag for each of the instruction decoder and nullifies the decoding as instruction as necessary by referring to the format information.

Figure 9:
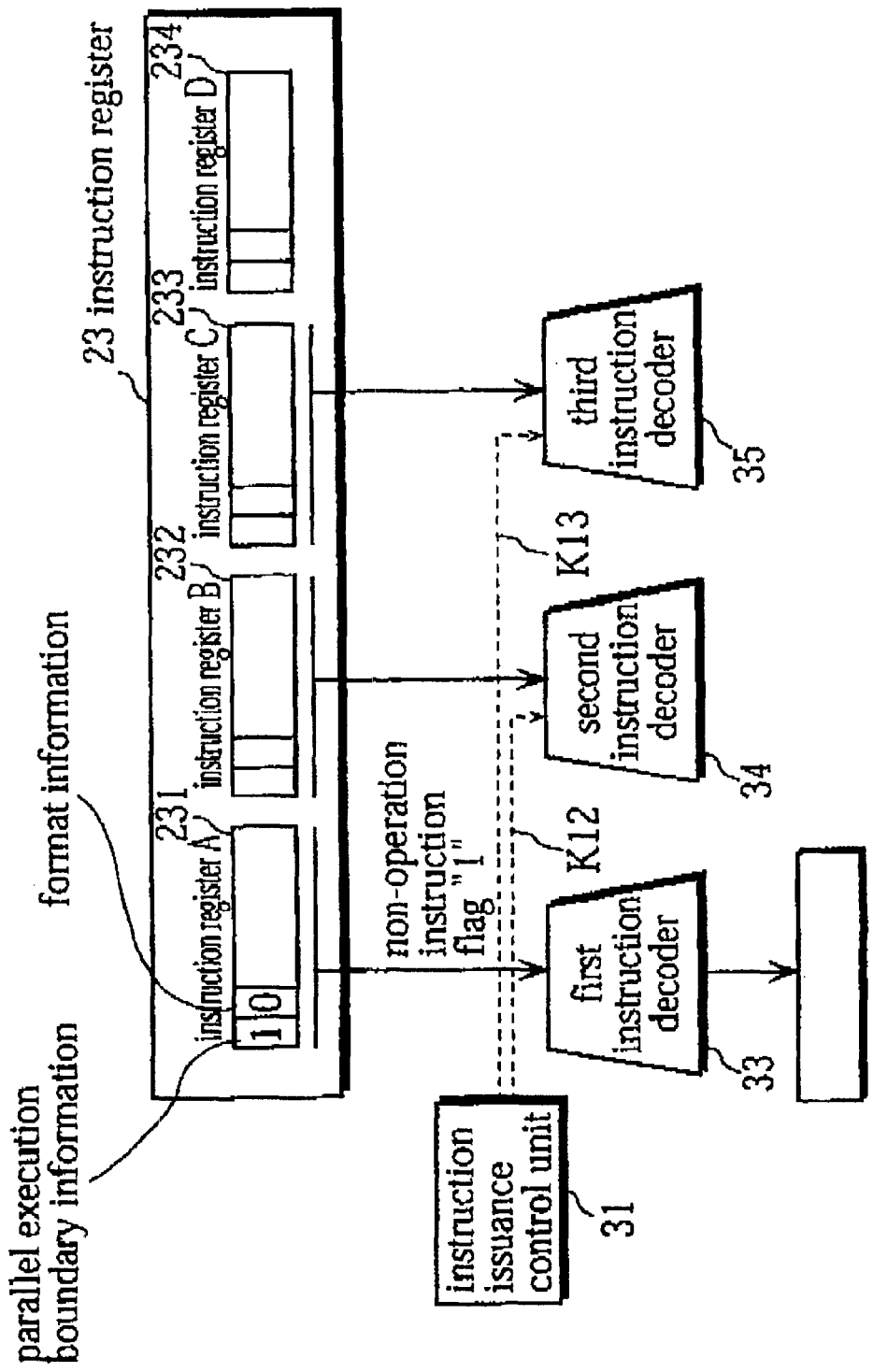
FIG. 9 shows operations by the instruction issuance control unit 31 and the peripheral elements in the processor 310 when the parallel execution boundary information of the unit 1 of the instruction register A231 is "1" and the format information is "0"

Next, when the parallel execution boundary information of the unit 1 is "1" and the format information is "0" in the instruction register A231 as shown in FIG. 9, only the unit 1 is issued in this cycle. For nullifying the decoding as instruction of the units 2 and 3, the instruction issuance control unit 31 outputs non-operation instruction flags for which "1" has been set to the second instruction decoder 34 and the third instruction decoder 35 via the control signal lines K12 and K13, respectively.

Figure 10:
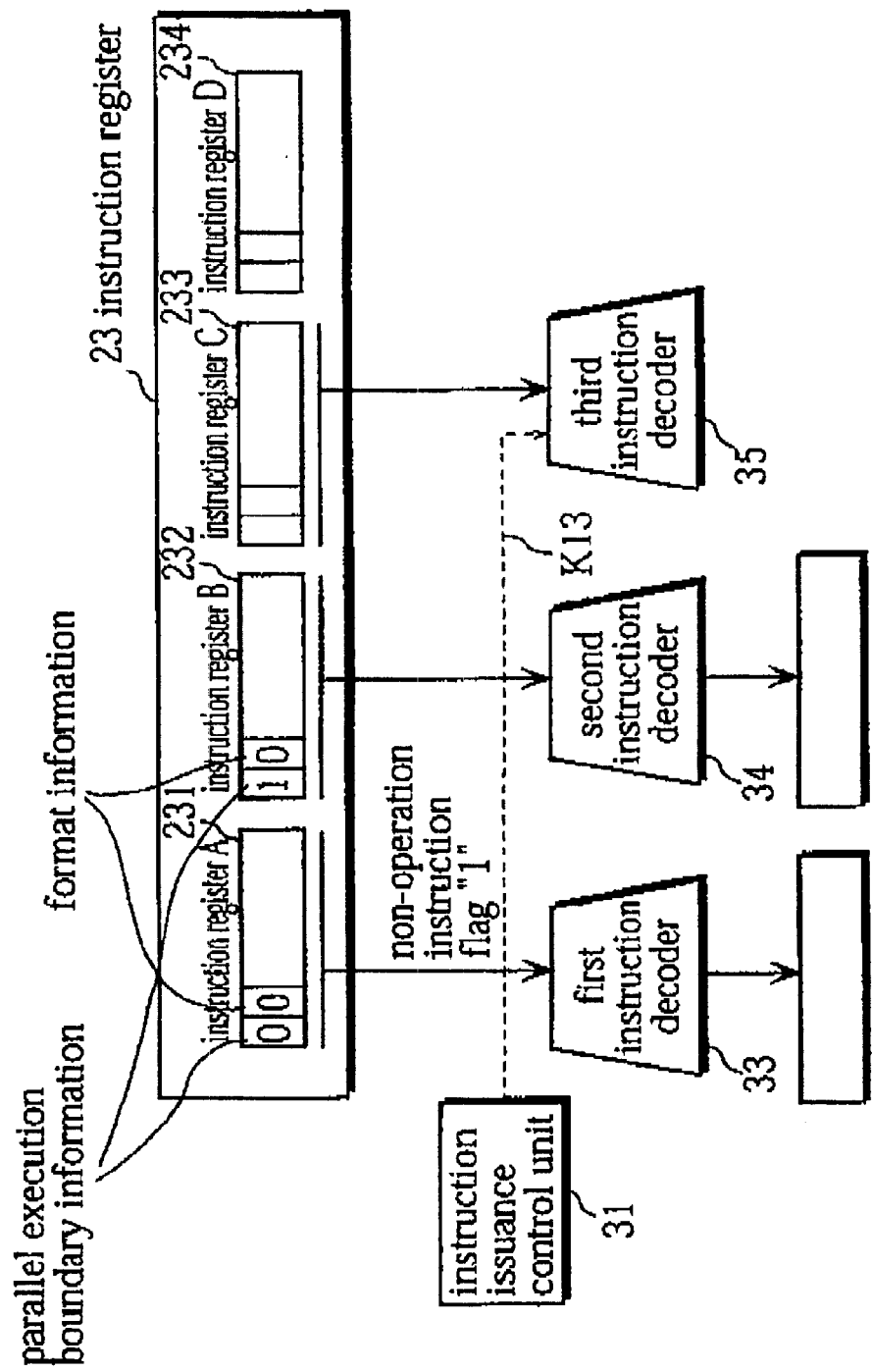
FIG. 10 shows operations by the instruction issuance control unit 31 and the peripheral elements in the processor 310 when the parallel execution boundary information of the unit 1 of the instruction register A231 is "0", the parallel execution boundary information of the unit 2 of the instruction register B232 is "1", and the format information of the units 1 and 2 are "0"

In addition, when the parallel execution boundary information of the unit 1 in the instruction register A231 is "0", the parallel execution boundary information of the unit 2 in the instruction register B232 is "1", and the format information of the units 1 and 2 are both "0" as shown in FIG. 10, only the instructions in units 1 and 2 are to be issued in this cycle. For nullifying the decoding as instruction of the unit 3, the instruction issuance control unit 31 outputs a non-operation instruction flag for which "1" has been set to the third instruction decoder 35 via the control signal line K13. Here, the third decoder 35 does not decode the unit 3.

As has been described, the instruction issuance control unit 31 sets each of the non-operation instruction decoders and nullifies decoding as instruction as necessary by referring to the parallel execution boundary information of the units that are stored in the instruction registers.

(2) Instruction Decoder 32

The instruction decoder 32 includes a first instruction decoder 33, the second instruction decoder 34, and the third instruction decoder 35 as shown in FIG. 4.

The first instruction decoder 33 reads a 21-bit unit from the instruction register A231, decodes the read unit, generates a control signal on the operation of the instruction that are included in the unit, outputs the generated control signal to the executing unit 40, and transfers the constant operand in the instruction to the data bus 48 in the executing unit 40 as shown in FIG. 5. Here, the first instruction decoder 33 decodes one instruction, outputs a control signal, and transfers a constant operand in one cycle.

The second instruction decoder 34 receives a non-operation instruction flag from the instruction issuance control unit 31 via the control signal line K12. When the received non-operation instruction flag is "0" the second instruction decoder 34 reads a 21-bit unit from the instruction register B232, decodes the instruction, generates a control signal, outputs the generated control signal to the executing unit 40, and transfers the constant operand in the instruction to the data bus 48 in the executing unit 40 as in the case of the first instruction decoder 33. Here, the second instruction decoder 34 decodes one instruction, outputs a control signal, and transfers a constant operand in one cycle. When the received non-operation instruction flag is "1", the second instruction decoder 34 outputs a control signal as a non-operation instruction to the executing unit 40.

When the units stored in the instruction registers A231 and B232 compose a 42-bit instruction, only part of the constant operand is put in the second one of the two units that compose a 42-bit instruction as shown by the instruction formats in FIG. 2. In other words, no op code is found in the second unit, so that the second unit needs not to be input into the second instruction decoder 34. As a result, the constant operand 50 of the 42-bit instruction is composed of a constant operand 50a, which has been output from the first instruction decoder 33, and a constant operand 50b, which has been directly transferred from the instruction register B232 under all conditions, as shown in FIG. 5.

As in the case of the second instruction decoder 34, The third instruction decoder 35 receives a non-operation instruction flag via the control signal line K13. When the received non-operation instruction flag is "0", the third instruction decoder 35 reads a 21-bit unit from the instruction register C233, decode the instruction, generates a control signal, outputs the generated control signal to the executing unit 40, and transfers the constant operand in the instruction to the data bus 48 in the executing unit 40 as in the case of the first instruction decoder 33. Here, the third instruction decoder 35 decodes one instruction, outputs one control signal, and transfers the constant operand in one cycle. When the received non-operation instruction flag is "1", the third instruction decoder 35 outputs a control signal as non-operation instruction to the executing unit 40.

As in the case described earlier, when the units stored in the instruction register C233 and the D234 compose a 42-bit instruction, the constant operand of the 42-bit instruction is composed of a constant 52a that has been output from the third instruction decoder 35 and a constant 52b from that has directly transferred from the instruction register D234 as shown in FIG. 5.

As has been described, the second instruction decoder 34 is nullified when either of the parallel execution boundary information and the format information of the unit that has been stored in the instruction register A231 is "1". The third instruction decoder 35 is nullified when either of the parallel execution boundary information of the unit that has been stored in the instruction register A231 and the format information of the unit that has been stored in the instruction register B232 is "1".

1.3.3. Executing Unit 40

The executing unit 40 is a circuit unit that executes at most three instructions in parallel according to the decoding result in the decoding unit 30. The executing unit 40 includes an execution control unit 41, the PC (Program Counter) unit 42, a register file 43, a first arithmetic operation unit 44, a second arithmetic operation unit 45, a third arithmetic operation unit 46, an operand access unit 47, and data buses 48, and 49. While the data bus 48 further includes L1, R1, L2, R2, L3, R3 buses, the data bus 49 further includes D1, D2, and D3 buses.

(1) Execution Control Unit 41

The execution control unit 41 receives control signals from the first, second, and third instruction decoders 33, 34, and 35, and controls the elements 42 to 49 in the executing unit 40 according to the received control signals. The execution control unit 41 includes a control circuit and wiring. The control circuit performs timing control, operation permission/prohibition control, status control, interrupt control and the like.

(2) PC Unit 42

The PC unit 42 holds an address that indicates the location of the instruction that is to be decoded next. The PC unit 42 outputs the address to the instruction fetch unit 21 in the instruction supply issuing unit 20.

(3) 44, 45, and 46

Each of the first, second, and third arithmetic operation units 44, 45, and 46 includes an ALU (Arithmetic Logic Unit) which each perform arithmetic logical operation on two pieces of data, a multiplier, a barrel shifter for performing shift operation, and a swapper for changing places of the upper and lower 32 bits of input data.

The first arithmetic operation unit 44 obtains values that are stored in the registers R0 to R31 via the L1 and R1 buses and the constant operands that have been output from the first instruction decoder 33 and the instruction register B232 via the R1 bus, and performs an operation using the obtained values under the control of the execution control unit 41. Then, the first arithmetic operation unit 44 divides the operation results into the upper 32 bits of data and the lower 32 bits of data, and transfers the upper and lower 32 bits of data to selectors 4321 and 4322, respectively via the D1 bus. A more detailed explanation of the selectors 4321 and 4322 will be given later.

As in the case of the first arithmetic operation unit 44, the second arithmetic operation unit 45 obtains values that have been stored in the registers R0 to R31 via the L2 and R2 buses and the constant operands that have been output from the second instruction decoder 34 and the instruction register C233, and performs an operation using the obtained values under the control of the execution control unit 41. Then, the second arithmetic operation unit 45 divides the operation result into the upper and lower 32 bits of data, and transfers the upper and lower 32 bits of data to the selectors 4321 and 4322, respectively via the D2 bus.

Similarly, the third arithmetic operation unit 46 obtains values that have been stored in the registers R0 to R31 via the L3 and R3 buses and the constant operands that have been output from the third instruction decoder 35 and the instruction register D234, and performs an operation using the obtained values under the control of the execution control unit 41. Then, the third arithmetic operation unit 46 divides the operation result into the upper and lower 32 bits of data, and transfers the upper and lower 32 bits of data to the selectors 4321 and 4322, respectively via the D3 bus.

(4) Operand Access Unit 47

The operand access unit 47 transfers operands between the register file 43 and the external memory.

More specifically, when an op code "ld (load)" is included in an instruction, the operand access unit 47 obtains one word (32 bits) of data that is in the external memory, and writes the obtained data in a designated register in the register file 43 via one of D1 to D3 buses. On the other hand, when an op code "st (store)" is included in an instruction, the operand access unit 47 obtains a value that has been stored in a designated register in the register file 43 via one of the L1 to L3 buses and writes the obtained value into the external memory.

(5) Register File 43

Figure 11:
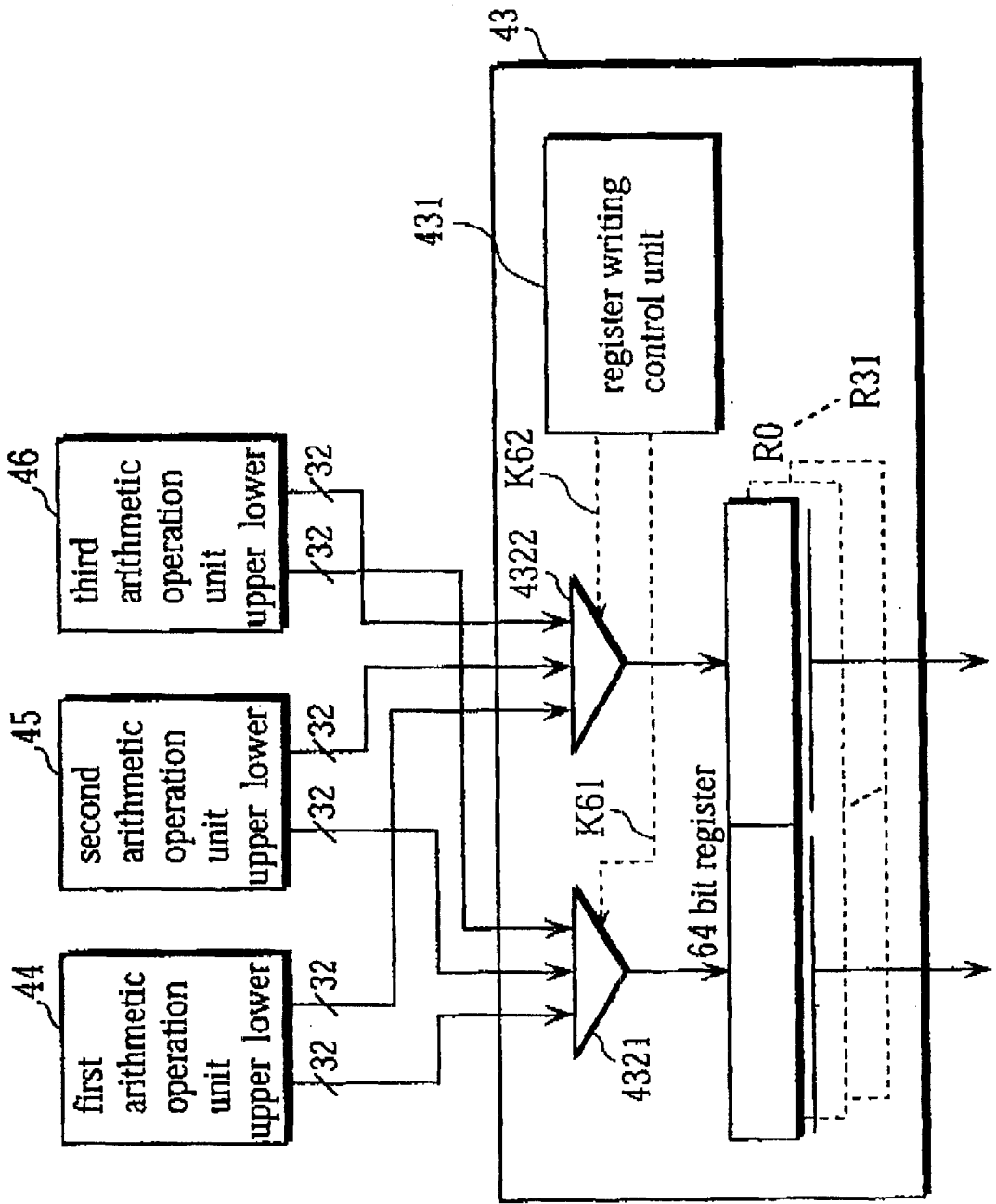
FIG. 11 is a block diagram showing the structure of a register file 43 and the peripheral elements in the processor 310.

As shown in FIG. 11, the register file 43 includes the 32 64-bit registers R0 to R31, the selectors 4321 and 4322, and a register writing control unit 431. The selectors 4321 and 4322 are connected to the register writing control unit 431 via the control signal lines K61 and K62, respectively. FIG. 11 is a block diagram showing the structure of a register file 43 and the peripheral. elements. This block diagram focuses on the register R0 in the register file 43.

The values that have been stored in the registers R0 to R31 are transferred to the first, second, and third arithmetic operation units 44, 45, and 46 and the operand access unit 47 via the data bus 48 according to the decoding results in the first, second, and third instruction decoders 33, 34, and 35. Arithmetic operation or operand access is performed in the first, second, and third arithmetic operation units 44, 45, and 46, and the operand access unit 47, and the results are transferred to the register file 43 via the data bus 49, and are stored in the registers R0 to R31.

Note that data that are written in the register file 43 include data that have been output from the first to third arithmetic operation units 44 to 46 and data that has been output from the operand access unit 47. The path of data output from the operand access unit 47 is not illustrated in FIG. 11 for clearly showing the structure. In reality, data output from the operand access unit 47 is transferred to the register via one of the output paths of the first to third arithmetic operation units 44 to 46.

The register writing control unit 431 outputs selector control information that includes the writing register numbers and information indicating the writing locations of at least three instructions to the selectors 4321 and 4322. Here the information indicating the. writing location indicates whether the instruction is to be written only in the upper 32-bit area or only in the lower 32-bit area.

When a plurality of instructions are to be. written in the same location (area), the selectors are controlled so that only the latest instruction is written and other instructions are not written according to the information on the order of the instructions in the program (referring to the order of the unit numbers in FIG. 3). In reality, instructions are issued to the first, second, and third arithmetic operation units 44, 45, and 46 in this order according to the order of the instruction in the program. As a result, the priority level for the writing of the result of operation by the third arithmetic operation unit 46, which executes operation according to the instruction that is located in latest part of the program, is highest. The priority level for the writing of the result of operation by the second arithmetic operation unit 45 is second highest.

The selector 4321 receives upper 32-bit data output from the first arithmetic operation unit 44, upper 32-bit data output from the second arithmetic operation unit 45, and upper 32-bit data output from the third arithmetic operation unit 46, receives selector control information output from the register writing control unit 431 via the control signal line K61. Then, the selector 4321 selects one of the upper 32-bit data output from the first, second, and third arithmetic operation units 44, 45, and 46 according to the selector control information, and writes the selected data into the upper 32-bit area in one of the registers R0 to R31 (that has been designated by the selector control information).

As in the case of the selector 4321, the selector 4322 receives lower 32-bit data output from the first, second, third arithmetic operation units 44, 45, and 46, receives selector control information output from the register writing control unit 431 via the control signal line K62. Then, the selector 4322 selects one of the lower 32-bit data output from the first, second, and third arithmetic operation units 44, 45, and 46 according to the selector control information, and writes the selected data into the lower 32-bit area in one of the registers R0 to R31 (that has been designated by the selector control information).

As has been described, writing into the upper and lower 32-bit areas are separately controlled in writing into a 64-bit register. The results of operation by the first to third arithmetic operation units 44 to 46 are divided into upper 32-bit data and lower 32-bit data and transferred to the selectors 4321 and 4322, respectively. The selectors 4321 and 4322 separately select upper 32-bit data and lower 32-bit data according to the control by the register writing control unit 431.

(6) Data Buses 48 and 49

The PC unit 42, the register file 43, the first arithmetic operation unit 44, the second arithmetic operation unit 45, the third arithmetic operation unit 46, and the operand access unit 47 are connected to each other via the data bus 48 (the L1, R1, L2, R2, L3, and R3 buses) and the data bus 49 (the D1, D2, and D3 buses) as shown in FIG. 4. Note that while the L1 and R1 buses are connected to two input ports of the first arithmetic operation unit 44, the L2 and R2 buses are connected to two input ports of the second arithmetic operation unit 45, and the L3 and R3 buses are connected to two input ports of the third arithmetic operation unit 46, the D1, D2, and D3 buses are connected to the output ports of the first, second, and third arithmetic operation units 44, 45, and 46, respectively.

1.4. Operations by Processor 310

Here, an explanation of operations by the processor 310 will be given by taking a case of decoding and executing a group of instructions as an example.

(1) Example of Group of Instructions

Figure 12:
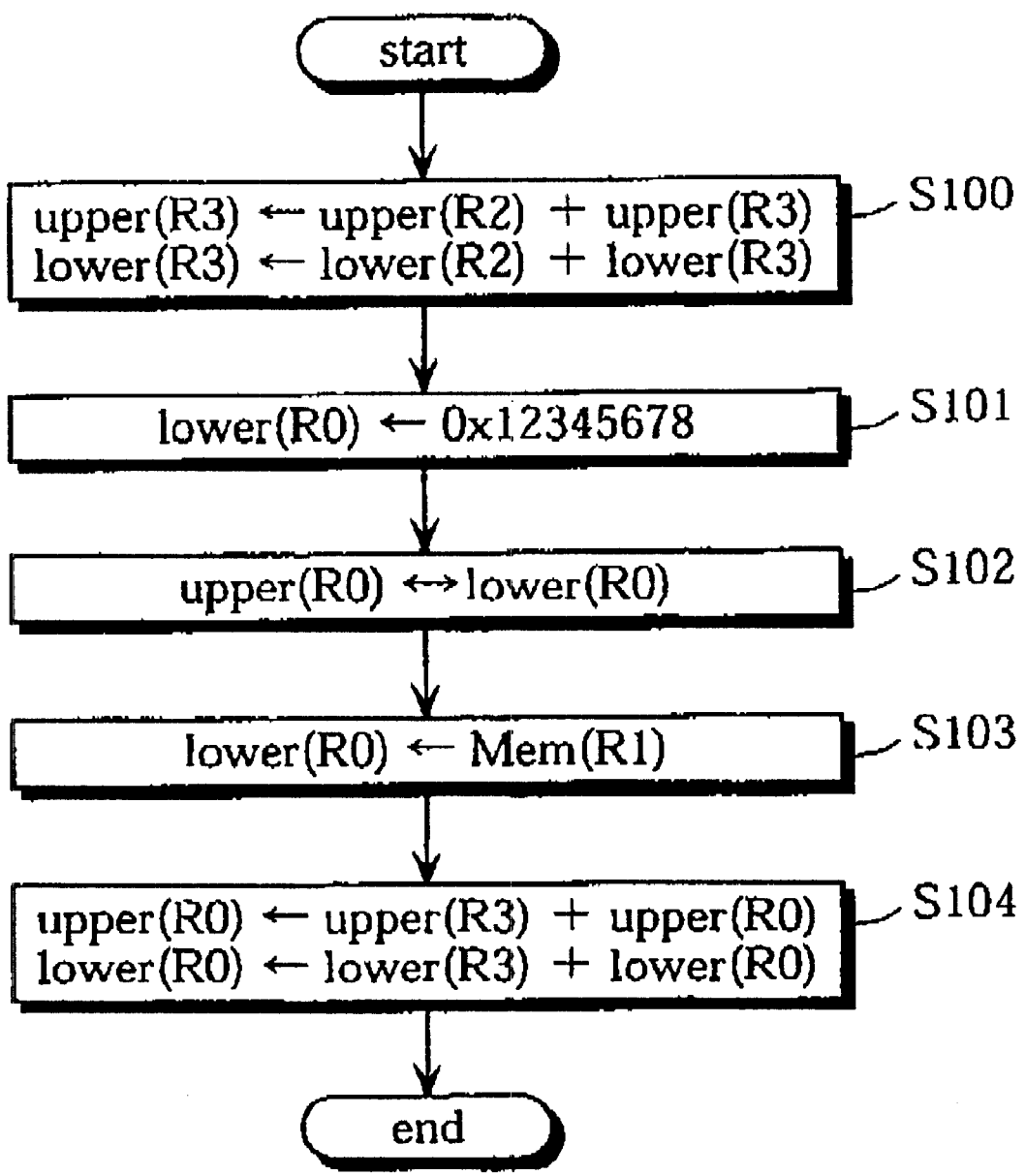
FIG. 12 is a flowchart showing an example of processing 64-bit data for explanation of operation by the processor 310.

FIG. 12 is a flowchart showing an example of processing 64-bit data.

In FIG. 12, the character string "upper" indicates the upper 32-bit area in a register, and the character string "lower" indicates the lower 32-bit area in a register. While a basic instruction refers to and updates only the "lower", only an SIMD instruction refers to and updates "upper" and "lower".

The group of instructions shown in FIG. 12 indicates that the operations described below are executed. An operation for adding the upper data of the registers R2 and R3 together and storing the addition result in the upper area in the register R3, and an operation for adding the lower data of the registers R2 and R3 together and storing the addition result in the lower area in the register R3 are separately executed (step s100). Then, a constant "0x12345678" (the character string "0x" indicates that the following numerics and characters are a hexadecimal number) is transferred to the lower area in the register R0 (step s101), and the places of the upper and lower data are changed (step s102). Next, the value that is stored in the location of the external memory whose address is indicated by the value stored in the register R1 is stored in the lower area in the register R1 (step s103). Finally, an operation for adding the upper data in the register R3 and R0 together and storing the addition result in the upper area in the register R0, and an operation for adding the lower data of the registers R3 and R0 together and storing the addition result in the lower area in the register R0 are separately executed (step s104).

According to the group of instructions, an SIMD type operation is performed between the registers R2 and R3 at step s100. Then, 64-bit data is set in the register R0 (the upper data is immediate data and the lower data is set by the external memory) at steps s101 to 103. Finally, an SIMD type operation is performed between the registers R0 and R3 at step s104.

Figure 13:
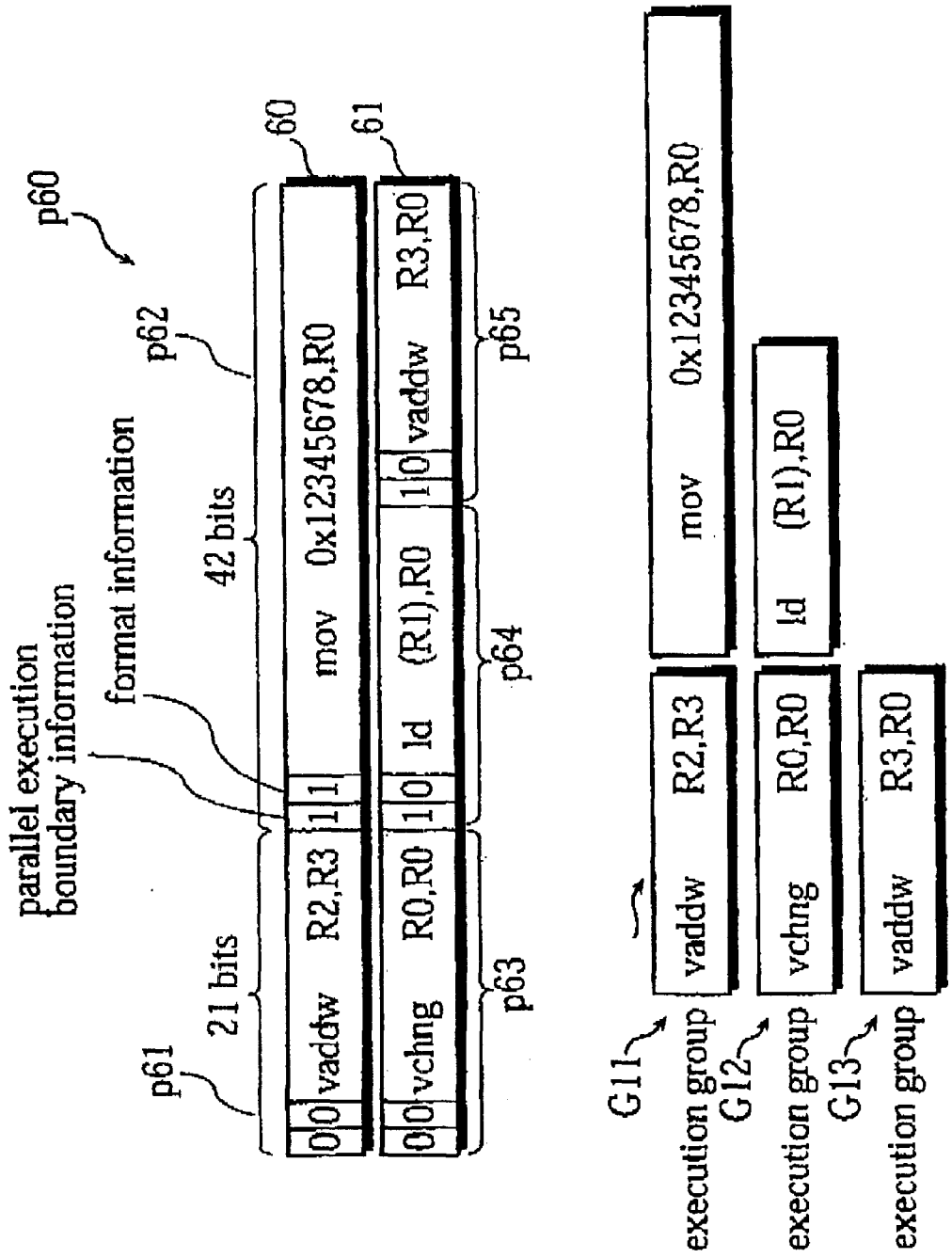
FIG. 13 shows examples of execution code of program and the execution sequence when the operations in FIG. 12 are executed by the processor 310.

FIG. 13 shows the content and the sequence of execution of a program P60 when the processing in FIG. 12 is executed by the processor 310 and when the processing is expressed in execution codes.

The program P60 includes five instructions P61 to P65, i.e., two instruction supply units, packets 60 and 61. The packet 60 includes two instructions P61 and P62, and the packet 61 includes three instructions P63 to P65.

The instruction P61 corresponds to step s100, the instruction P62 step s101, the instruction P63 step s102, the instruction P64 step s1O3, and the instruction P65 step s104.

The contents of operations by the instructions in the program P60 are described using mnemonics in the fields in execution codes. More specifically, the mnemonic "vaddw" in the instructions 61 and 65 indicates an SIMD type addition in which the addition of the upper data of two pieces of 64-bit data and the addition of the lower data of the two pieces of 64-bit data are performed in parallel. The mnemonic "mov" in the instruction P62 indicates the transfer of a constant and the stored value of a register to the lower 32-bit area in another register. The mnemonic "ld" in the instruction P64 indicates the transfer from the external memory to the lower 32-bit area in a register.

Here, a character string "Rn" (n=0–31) indicates one register in the register file 43. The parallel execution boundary information and the format information of each instruction are indicated by "0" or "1".

As shown in FIG. 13, the instruction in the program P60 are divided into three execute groups. An execute group G11 includes the instructions P61 and P62, an execute group G12 includes the instructions P63 and P64, and the execute group G13 includes the instruction P65. Instructions in the same execute group are executed as a group.

More specifically, when the instructions included in the execute group G11 are executed and completed, the instructions in the execute group G12 are executed. After the execution of the instructions in the execute group G12, the instruction in the execute group G13 is executed.

The instructions P61 and P62 included in the execute group G11 are executed in parallel. On the other hand, the instructions P63 and P64 in the executed group G12 are executed in parallel (2) Operations by Processor 310 in Executing Instructions An explanation of operations by the processor 310 or each execute group in executing the operations shown n FIG. 12 will be given below.

(Fetch of Instruction)

The instruction fetch unit 21 fetches the packet 60 from the external memory, and the instruction buffer 22 stores the packet 60. Then, the instruction fetch unit 21 fetches the packet 61 from the external memory, and the instruction buffer 22 stores the packet 61. The instruction 61 in the packet 60 stored in the instruction buffer 22 is transferred to the instruction register A231, and the upper and lower data of the instruction P62 are transferred to the instruction registers B232 and C233, respectively. The instruction P63 in the packet 61 stored in the instruction buffer 22 is transferred to the instruction register D234.

(Execution of Execute Group G11)

The instruction issuance control unit 31 refers to the parallel execution boundary information and the format information to control instruction issue. More specifically, the instruction issuance control unit 31 connects the second and third units as one instruction since the format information of the second unit is "1". On the other hand, the instruction issuance control unit 31 issues the two instructions in the first to third units as instructions to be executed in parallel in one cycle since the parallel execution boundary information of the first unit is "0" and the parallel execution boundary information of the second unit is "1".

In the executing unit 40, the addition of the upper data of the registers R2 and R3 and the addition of the lower data of the R2 and R3 are independently performed. The results of the additions are stored in the upper and lower areas, respectively. To the lower 32-bit area in the register R0, the constant "0x12345678" is transferred.

The instructions P63 to P65 in the packet 61 are not issued and remain in the instruction buffer 22.

(Execution of Execute Group G12)

The instruction P63 in the packet 61 that is stored in the instruction buffer 22 is transferred to the instruction register A231, the instruction P64 to the instruction register B232, and the instruction P65 to the instruction register C233.

The instruction issuance control unit 31 controls instruction issuance so that each of the three units are issued as a 21-bit instruction since the format information of the three units are "0". On the other hand, the parallel execution boundary information of the first unit is "0" and the parallel execution boundary information of the second unit is "1", so that the instruction issuance control unit 31 controls instruction issuance so that two instructions of the first and second units are issued. Not having been issued, the third unit remains in the instruction buffer 22.

In the executing unit 40, the places of the upper 32-bit data and the lower 32-bit data of the value stored in the register R0 are changed in the first arithmetic operation unit 44, 32-bit of data is read from the location in the external memory whose address is indicated by the register R1 in the operand access unit 47, and both of the data in the first arithmetic operation unit 44 and the read 32-bit data are transferred to the register file 43.

Then, since only the instruction "vchng" is to write the result in the upper area in the register R0, the register writing control unit 431 controls the selector 4321 so that the result of the instruction "vchng", i.e., the output from the first arithmetic operation unit 44 is selected. For the lower area in the register R0, the results of two instructions are to be written, and the "ld" instruction comes later according to the order in the program. As a result, the register writing control unit 431 controls the selector 4322 so that the result of the "ld" instruction, i.e., the output from the operand access unit 47 is selected. By doing so, more specifically, the constant "0x12345678" is stored in the upper 32-bit area in the register R0 and the value stored in the location in the external memory whose address is indicated by the stored value in the register R1 is stored in the lower 32-bit area in the register R0 when the cycle is completed.

As has been described, an instruction for changing part of the area in a register and an instruction for changing the whole or part of the area in the register can be executed in parallel in the same cycle.

Note that an explanation of the compiling apparatus for generating the execution codes and the method for scheduling instructions will be given later.

(Execution of Execute Group G13)

One unit (the instruction P65) that has been stored in the instruction buffer 22 is transferred to the instruction register A231. Having the format information "0", this unit is a 21-bit instruction. Since the parallel execution boundary information of this unit is "1", the instruction issuance control unit 31 issues one 21-bit instruction. Here, all the provided units are issued.

The executing unit 40 adds the upper data of the registers R0 and R3 together and stores the result in the upper area in the register R0, and adds the lower data of the registers R0 and R3 together and stores the result in the lower area in the register R0.

As has been described, the program for the operations shown in FIG. 12 is executed by the three execute groups G11 to G13 in the processor 310. Here, the execute groups are not executed in parallel. The execute groups are executed in order.

1.5. Comparison with Conventional Processor

An explanation of the operations in FIG. 12 by a conventional processor will be given below in comparison with the processor 310.

Figure 14:
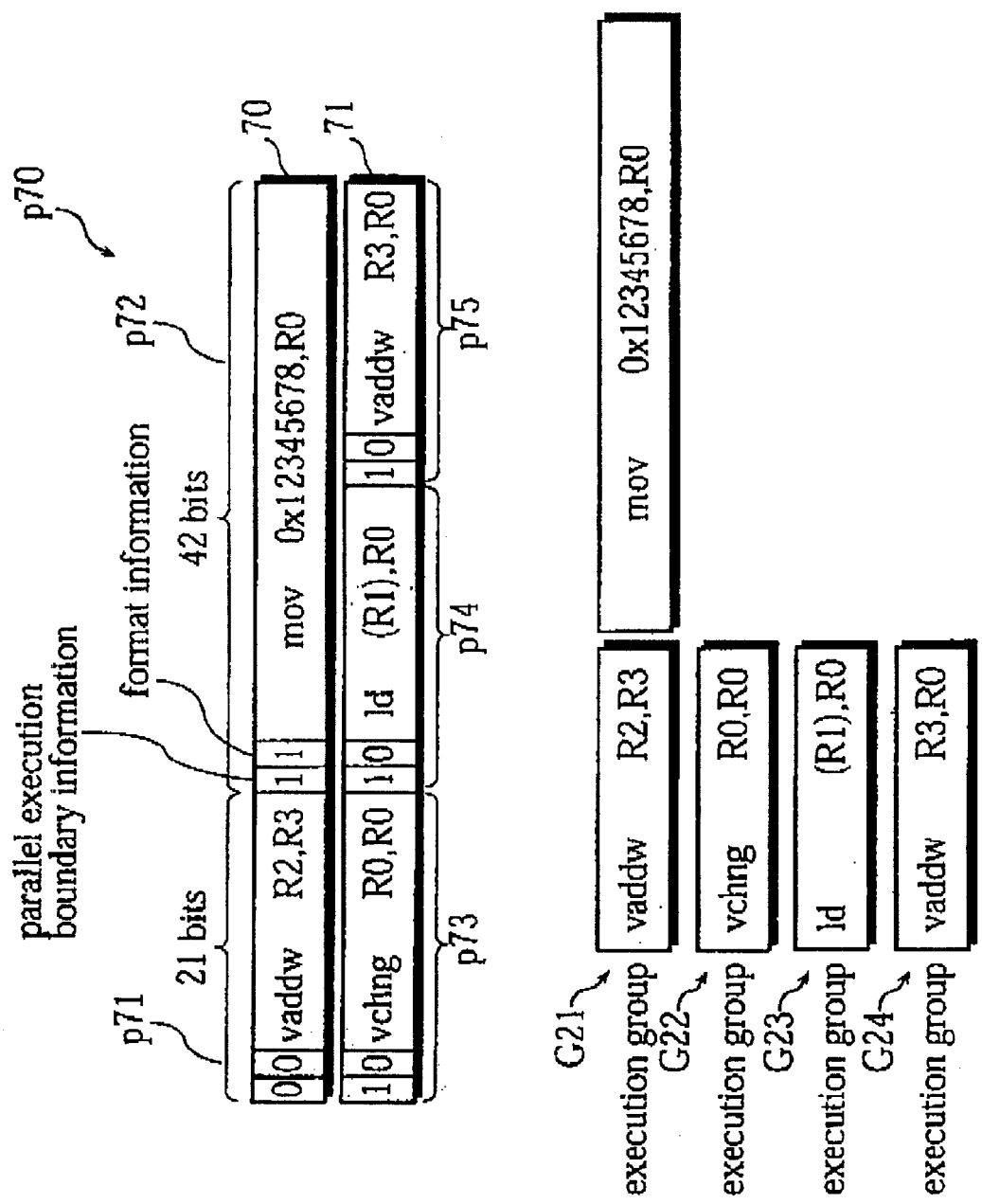
FIG. 14 shows examples of execution code of program and the execution sequence when the operations in FIG. 12 are executed by a conventional processor.

FIG. 14 shows the content and the order of the execution of a program 70 when the operations in FIG. 12 are executed by a conventional processor and when the operations are expressed by execution codes.

As in the case of the program P60 in FIG. 13, the program P70 includes two packets 70 and 71. The packet 70 includes instructions P71 and P72, and the packet 71 includes instructions P73 to P75. As in the case of the codes in FIG. 13, the contents of the instructions are described using mnemonics.

The instructions P70 to P75 correspond to the instructions P60 to P65. The program P70 differs from the program P60 in one way. While the parallel execution boundary information of the "vchng" instruction is "1" in the instruction P73, the parallel execution boundary information of the "vchng" instruction is "0" in the instruction P63.

The difference is caused by the reason described below. The destination registers of the "vchng" instruction in the instruction P73 and the "ld" instruction in the instruction P74 are both the register R0. A conventional compiling apparatus judges that the two instructions are not executed in parallel in the conventional processor structure, and outputs the execution codes that are a "vchng" instruction to which parallel execution boundary information "1" has been added. As a result, four execute groups G21 to G24 are executed in order as shown in FIG. 14. The execute group G21 includes the instructions P71 and P72, the execute group G22 the instruction P73, the execute group G23 the instruction P74, and the execute group G24 the instruction P75.

As has been described, a conventional processor dose not separately control writing in the upper and lower areas of a register, so that a hazard arises between two instructions that are written in the same register and the two instructions cannot be executed in parallel. As a result, when four instructions are included whose destinations are all the register R0 as in the case of the processing shown in FIG. 12, the four instructions are divided into at least four execute groups. The four execute groups are not executed in parallel, but executed in order.

As has been described, in the processor 310, the number of execute cycles is smaller than in a conventional one by one cycle.

2. Compiling Apparatus 200

The compiling apparatus 200 generates codes that are to be executed by the processor 310.

2.1. Term and Object Processor

Here, terms to be used, the object processor, and the structure of and operations by the compiling apparatus 200 will be described.

First, an explanation of terms used in the description will be given below.

An "object code" is a machine language program including relocatable information for the object processor. An object code is converted into an execution code by linking and deciding undefined addresses.

A "predecessor" is an instruction that needs to be executed before executing another instruction in order to execute the other instruction.

Then, an explanation of a processor that is the object of the compiling apparatus 200 will be given below.

The object processor of the compiling apparatus 200 is the processor 310 that has been described. The processor generates execute groups by referring to the parallel execution boundary information that has been supplied by the compiling apparatus 200. The processor itself does not judges whether instructions can be executed in parallel. As a result, it is assured by the compiling apparatus 200 that instructions which can be executed in parallel are properly arranged between parallel execution boundaries, i.e., in one execute group.

Here, the conditions for instructions that are arranged between parallel execution boundaries are given below. Instructions are executed in parallel only when the three conditions below are met.

Condition 1: the number of instructions in one execute group is smaller than 4.

Condition 2: the instruction decoder of the processor decodes the first to third units in one execute group as instruction (refer to FIG. 5).

Condition 3; the total number of resources in the object processor that are used by the instructions in one execute group is three ALU units, one memory access unit, and one branch unit at most.

An object processor does not necessarily execute the instructions in one execute group in parallel. An object processor can divide the instructions in one execute group into more than two groups to be separately executed due to the delay of the supply of instruction, for instance. As a result, the compiling apparatus 200 needs to set the order of the instructions in an instruction group so that the program is properly performed even if one execute group is divided into more than two separately-executed groups.

2.2. Structure of Compiling Apparatus 200

Figure 15:
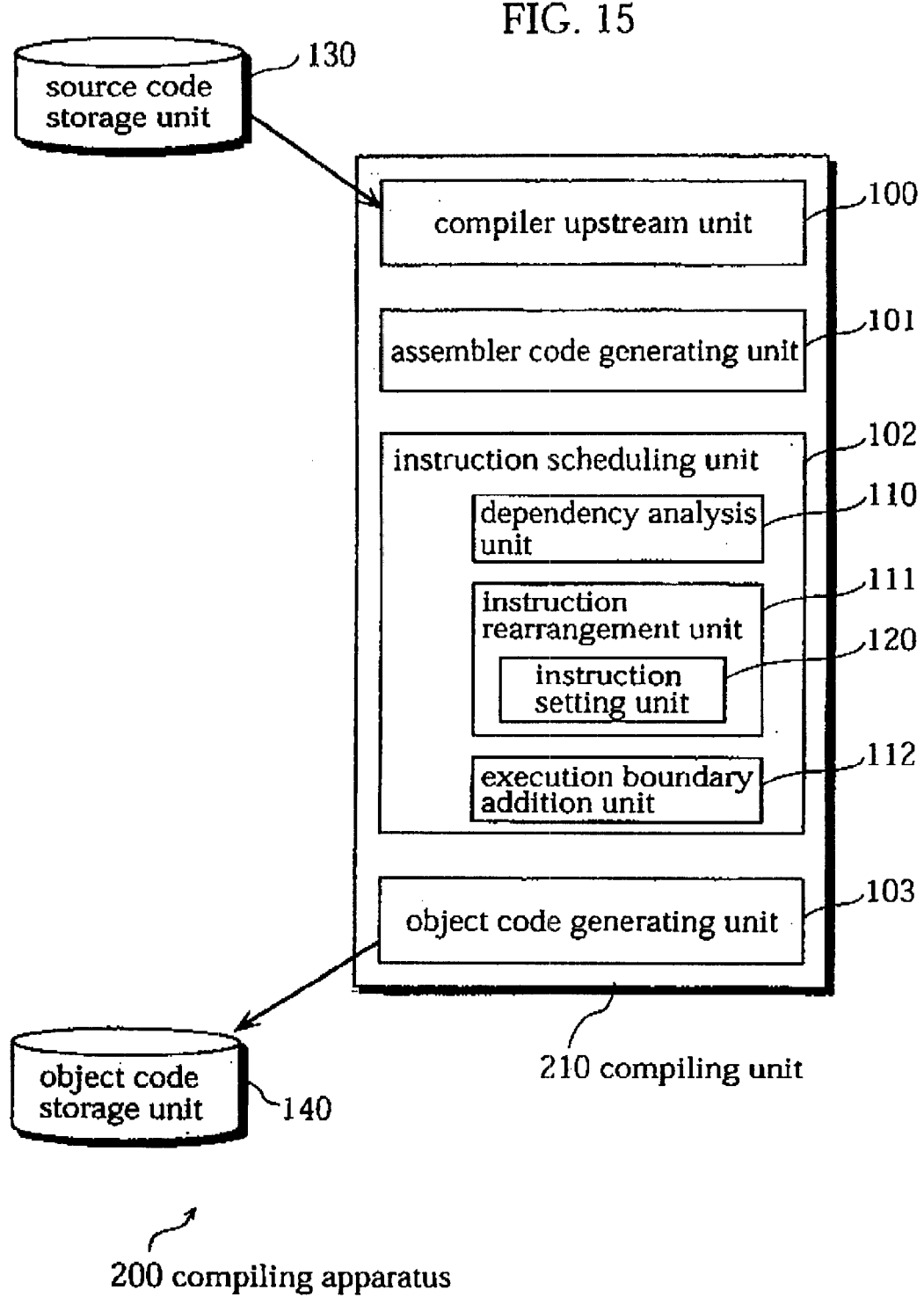
FIG. 15 is a block diagram showing the structure of a compiling apparatus 200.

An explanation of the compiling apparatus 200 will be given with reference to FIG. 15. Here, FIG. 15 is a block diagram showing the structure of the compiling apparatus 200.

As has been described, the compiling apparatus 200 includes the source code storage unit 130, the compiling unit 210, and the object code storage unit 140. The compiling apparatus 200 is a program processor, which generates object codes from source codes described in a high-level language that are stored in the source code storage unit 130 and writes the generated object codes in the object code storage unit 140. The compiling unit 210 includes a compiler upstream unit 100, an assembler code generating unit 101, an instruction scheduling unit 102, and an object code generating unit 103.

More specifically, the compiling apparatus 200 includes a processor, a ROM, a RAM, and a hard disk. The construction elements of the compiling apparatus 200 have the processor execute a computer program.

2.2.1. Compiler Upstream Unit 100 and Assembler Code Generating Unit 101

The compiler upstream unit 100 reads high-level language source codes from the source code storage unit 130 that are stored in a file format, performs syntax and semantic analysis on the high-level language source codes, and generates intermediate codes. The compiler upstream unit 100 optimizes the internal format codes so that the size of the eventually-generated execution codes is small and the execute period of time is short as necessary.

The assembler code generating unit 101 generates assembler codes from the internal format codes that have been generated and optimized by the compiler upstream unit 100.

Operations by the compiler upstream unit 100 and the assembler code generating unit 101 are not the theme of the present invention and the same as the well-known operations in a conventional compiling apparatus, so that no more detailed explanation of the operations will be given.

2.2.2. Instruction Scheduling Unit 102

The instruction scheduling unit 102 analyze dependency relations among instructions, performs instruction scheduling (rearranges the instruction order), and adds parallel execution boundary information for the assembler codes that have been generated by the assembler code generating unit 101, and puts the assembler codes in parallel for the object processor. The instruction scheduling unit 102 includes a dependency analysis unit 110, an instruction rearrangement unit 111, and an execution boundary addition unit 112. Note that the instruction scheduling unit 102 is supposed to operate for one basic block at a time for convenience in explanation.

Here, a basic block is a series of instructions that is to be executed from the first to the last instructions. The series of instructions includes no instruction for transferring control out of the instructions, and no instruction in the series is executed by control of any outside instructions.

(1) Dependency Analysis Unit 110

The dependency analysis unit 110 analyze the dependency relations among the instructions in a basic block and generates an dependency graph showing the dependency relations among the instructions. The dependency graph includes nodes corresponding to the instructions and edges (arrows, or directed edges) corresponding to the dependency relations for each of the instructions in the basic block according to the assembler codes that have been generated by the assembler code generating unit 101. Note that the method of generating a dependency graph is well known and disclosed, for instance, R. J. Blainey, "Instruction Scheduling in the TOBEY Compiler" (IBMJ. RES. DEVELOP. Vol. 38, No. 5, September, 1994), so that no more detail will be given.

There are three kinds of dependency relation among instructions described below.

Data dependency relation: dependency relation between an instruction for storing data in a resource and an instruction for referring to data in the resource.

Antidependency relation: dependency relation between an instruction for referring to data in a resource and an instruction for storing data in the resource.

Output dependency relation: dependency relation between an instruction for storing data in a resource and an instruction for storing data in the resource.

If the order of instructions is changed for any dependency relation, the program has a different meaning, so that dependency relations needs to be maintained in relocating instructions.

Figure 16:
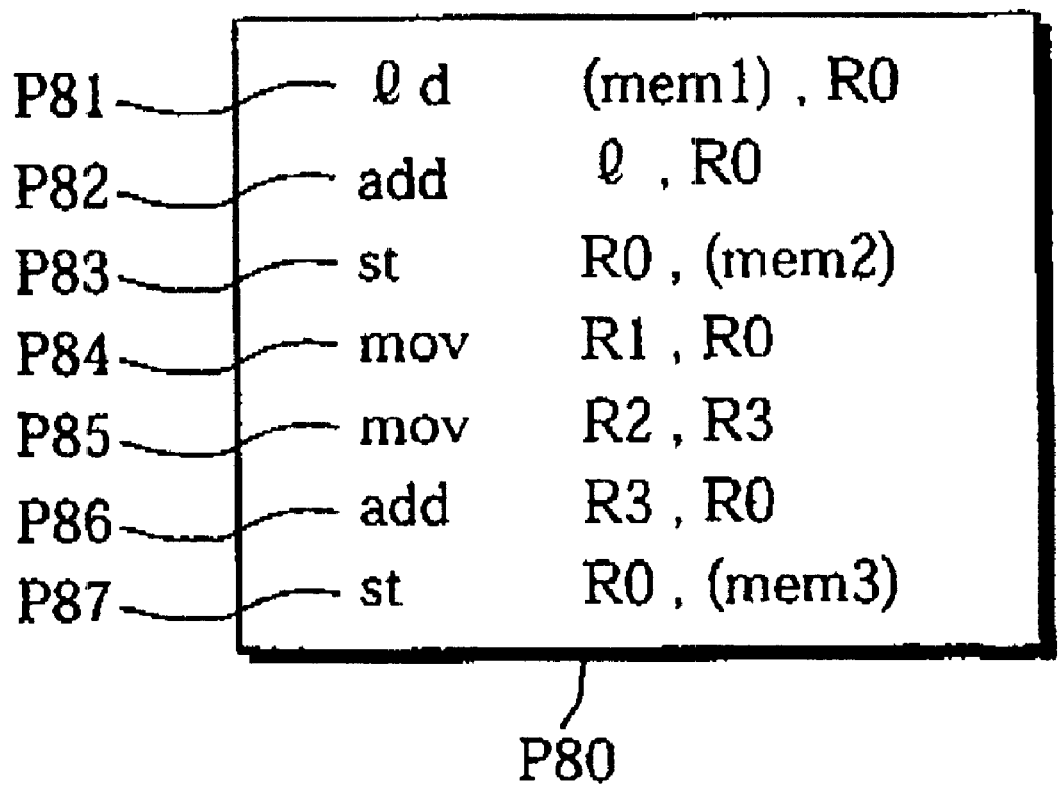
FIG. 16 shows a program P80 for explanation of a dependency graph.

FIG. 16 shows a program P80 for explanation of a dependency graph. The program PS0 is described in the assembler codes. The program P80 includes instructions P81 to P87.

Figure 17:
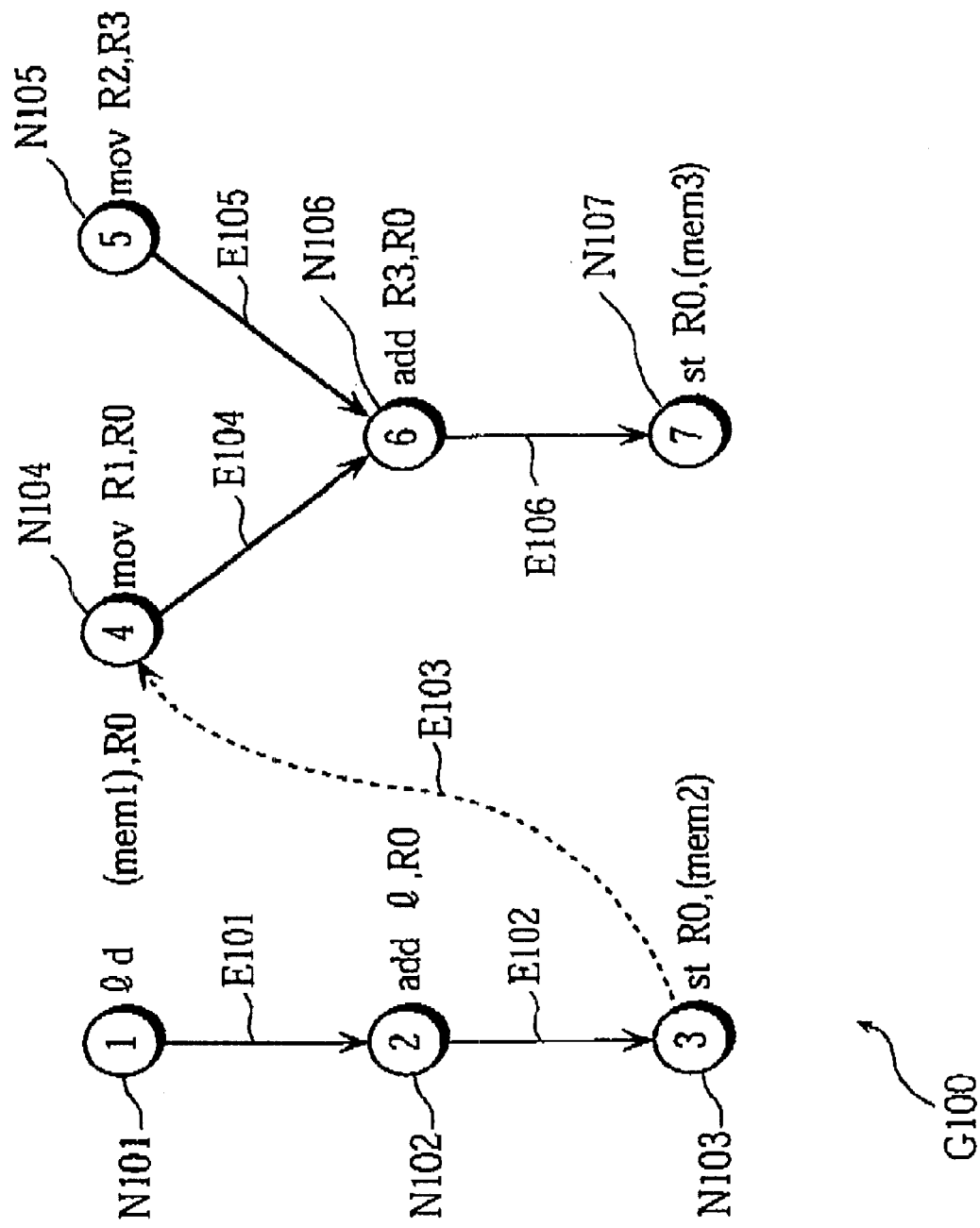
FIG. 17 visually shows a dependency graph G100 corresponding to the program P80.

On the other hand, FIG. 17 visually shows a dependency graph G100 corresponding to the program P80. The dependency graph G100 includes nodes N101 to N107 and edges E101 to E106. The nodes N101 to N107 correspond to the instructions P81 to P87, respectively. The edges E101 to E107 are directed edges. The edge E103 shows an antidependency relation and the other edges show data dependency relations.

The nodes N101 and N102 are connected via the edge E101 that is directed from the node N101 to the node N102. The nodes N102 and N103 are connected via the edge E102, which is directed from the node N102 to the node N103. The nodes N103 and N104 are connected via the edge E103, from the node N103 to the node N104. The nodes N104 and N106 are connected via the edge E104, from the node N104 to the node N106. The nodes N105 and N106 are connected via the edge E105, from the node N105 to the node N106. The nodes N106 and N107 are connected via the edge E107, from the node N106 to the node N107

Although the dependency graph G100 is visually shown in FIG. 17 for convenience in explanation, note that a dependency graph is not a picture but a group of data composed of nodes and edges.

According to a conventional dependency analysis method, one register is treated as one resource and dependency relations are analyzed by referring to register names, or operands described in assembler codes.

On the other hand, the dependency analysis unit 110 treats the area of part of one register as one resource, considering the characteristics of instructions for the object processor, i.e., an instruction to store data in the area of part a 64-bit register or an instruction to refer to data from the area of the part.

More specifically, the dependency analysis unit 110 treats the upper and lower 32-bit areas of a 64-bit register as independent resources. For instance, an instruction to refer to the whole of a 64-bit register is considered as an instruction to refer to two resources, i.e., the upper and lower resources. On the other hand, an instruction to refer to only the lower 32-bit area in one register is considered as an instruction to refer to the lower 32-bit resource. In this case, the lower 32-bit resource of the register is considered to have no dependency relation with the upper 32-bit resource of the register.

Meanwhile, the dependency analysis unit 110 includes a reference storage resource table T100 shown in FIG. 18.

The reference storage resource table T100 includes a plurality of groups which each are composed of kinds of instruction and types of instruction. Each of the instructions includes registers Rn and Rm in the operand. Here, the value of "n" is 0 to 31 and the value of "m" is 0 to 31.

The types of instruction are combinations of 8 cases that are described below.

In the reference storage resource table T100, a case to which a "O" mark is attached is included in a combination, and a case to which a "X" mark is not included in a combination.

For instance, in the reference storage resource table T100, a "O" mark is put for cases 2 and 8 and an "X" mark is put for the other cases for the type corresponding to a kind of instruction "mov Rn, Rm". This indicates that the instruction is a type of instruction "to refer to data in the lower 32 bits of a register Rn and store data in the lower 32 bits of a register Rm".

(Case 1)
The instruction refers to data in the upper 32 bits of the register Rn.

(Case 2)
The instruction refers to data in the lower 32 bits of the register Rn.

(Case 3)
The instruction refers to data in the upper 32 bits of the register Rm.

(Case 4)
The instruction refers to data in the lower 32 bits of the register Rm, (Case 5)
The instruction stores data in the upper 32 bits of the register Rn.

(Case 6)
The instruction stores data in the lower 32 bits of the register Rn.

(Case 7)
The instruction stores data in the upper 32 bits of the register Rm.

(Case 8)
The instruction stores data in the lower 32 bits of the register Rm.

Referring to the reference storage resource table T100, the dependency analysis unit 110 knows the type of an instruction and obtains the information on the resources in which the instruction refers to and stores data. According to the information, a dependency relation including nodes and edges (arrows) is generated.

As has been described, more precise dependency relations are obtained compared with the method of only referring to register names by independently controlling the upper and lower 32 bits of one register. Accordingly, the number of unnecessary edges (arrows) in a dependency graph is reduced and enhance the possibility of parallel execution of instructions.

For instance, when an instruction group includes an instruction to store data in the upper 32 bits of one register and another instruction to refer to data in the lower 32 bits of the same register, it is recognized that there is a data dependency relation between the two instructions in a conventional dependency graph generating method since dependency relations are recognized by the register names. As a result, the two instructions are not executed in parallel.

On the other hand, the dependency analysis unit 110 judges that there is no data dependency relation between the two instructions, so that the two institutions are executed in parallel. Note that an specific example will be given later along with an explanation of the specific operations by the compiling apparatus 200.

(2) Instruction Rearrangement Unit 111

The instruction rearrangement unit 111 rearranges the instructions in the basic block using the dependency graph that has been generated by the dependency analysis unit 110 to generate assembler codes that are put in parallel for the object processor. The instruction rearrangement unit 111 includes an instruction setting unit 120.

An explanation of operations by the instruction rearrangement unit 111 will be given with reference to the flowchart in FIG. 19.

The instruction rearrangement unit 111 performs the operations described below (steps s2 to s10) for each of the nodes in the dependency graph that the dependency analysis unit 110 has generated (loop 1: steps s1 to s11).

First, the instruction rearrangement unit 111 extracts nodes that can be arrangement candidates from the dependency graph as prospective nodes to generate an arrangement candidate group including the prospective nodes. Here, a node that can be an arrangement candidate is a node for which all the predecessors have been arranged (step s2).

Next, the instruction rearrangement unit 111 performs the operations described below (steps s4 to s8) for each of the prospective nodes in the arrangement candidate group (loop 2: steps s3 to s9).

The instruction rearrangement unit 111 extracts a prospective node from the arrangement candidate group that is supposed to be optimum to arrange (referred to "optimum node" in this specification) (step s4). An explanation of the method of determining the optimum node will be given later.

Then, it is judged whether the optimum node can be arranged. When the optimum node can be arranged (step s5), the optimum node is provisionally arranged in a provisional arrangement node group (step s6). The judgement depends on whether the optimum node satisfies the constraints of the arithmetic operation units, the number of instructions, and the instruction decoders.

Next, the provisional arrangement node group that is provisionally arranged at this point in time is checked and it is judged whether an instruction can be further arranged. When it is judged that no instruction can be arranged (step s7), loop 2 is completed and the processing advances to step s10.

When it is judged that an instruction can be arranged (step s7), it is judged whether a node that can be a new arrangement candidate appears. When appearing, a new arrangement candidate is added to the arrangement candidate group (step s8). A node that can be a new arrangement candidate is a node that has only the optimum node (that is going to be arranged) as the predecessor and has an antidependency relation or an output dependency relation with the optimum node More specifically, a node that can be a new arrangement candidate is executed in the same cycle as the optimum node but not executed in a cycle that precedes the cycle.

After the completion of loop 2, the nodes included in the provisional arrangement node group are fixed as arrangement nodes (step s10). More specifically, the instructions corresponding to the nodes in the provisional arrangement node group are extracted from the original instruction group and are rearranged in a new instruction group that is to be transferred to the execution boundary addition unit 112. At this stage, part of the instructions in the arrangement candidate group is fixed as a group of instructions that are to be executed in parallel. A series of operations shown in steps s3 to s10 forms the instruction setting unit 120.

Here, an explanation of how the optimum node is determined at step s4 will be given. The optimum node is determined by heuristically selecting the instruction that is supposed to execute the instructions in the basic block in a shortest period of time by referring to the dependency graph and the provisional arrangement node group. Here, the instruction for which the total execution time of the instructions to a last node is longest in the dependency graph at this point in time is selected as the optimum node. When a plurality of instructions satisfy the condition, the instruction that comes earliest in the original order of instructions is determined as the optimum node.

(3) Execution Boundary Addition Unit 112

The execution boundary addition unit 112 adds a parallel execution boundary to the last instruction in the group of instructions whose arrangement has been fixed at step s9 in the instruction rearrangement unit 111 and outputs the group of instructions to which the parallel execution boundary has been added.

2.2.3. Object Code Generating Unit 103

The object code generating unit 103 converts the group of instructions (assembler codes) that have been output from the instruction scheduling unit 102 into object codes and writes the object codes in the object code storage unit 140 as a file.

2.3. Operations by Compiling Apparatus 200

Here, an explanation of operations by the construction elements of the compiling apparatus 200 will be given using a specific group of instructions.

Figure 20:
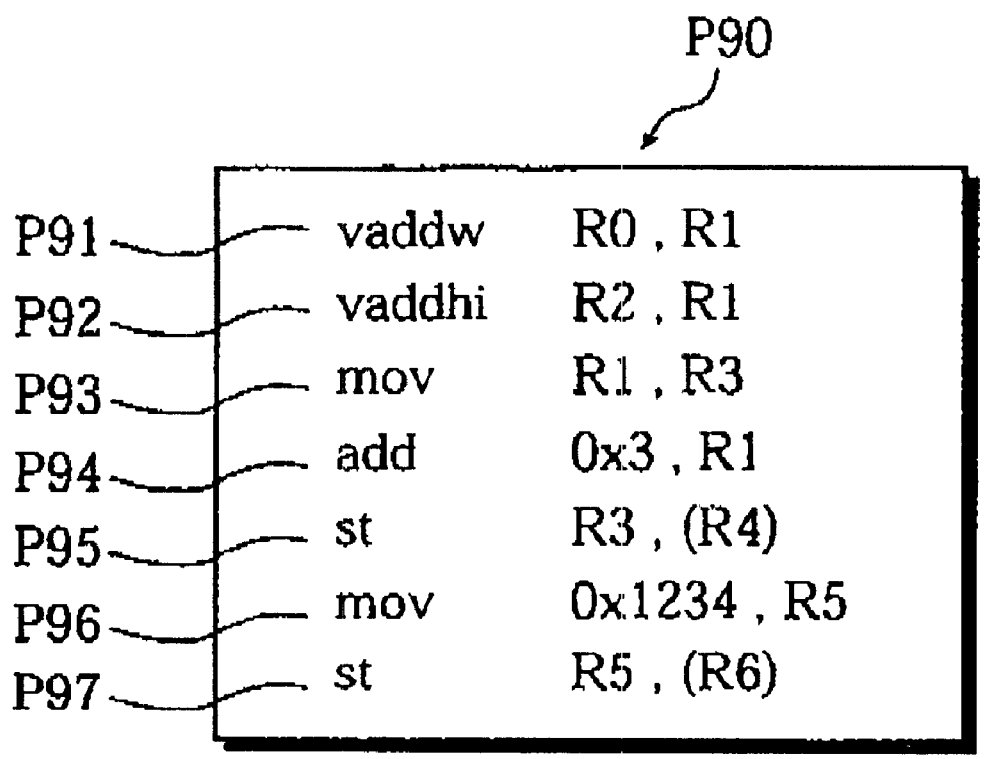
FIG. 20 shows a program P90, which is used as an example for explanation of operations by the compiling apparatus 200.

FIG. 20 shows a program P90, which is used as an example for explanation of operations by the compiling apparatus 200. The program 90 is assembler codes that have been generated from source codes by the compiler upstream unit 100 to the assembler code generating unit 101. The program 90 includes instructions P91 to P97.

Explanation of the instructions P91 to 97 will be given below.

The instruction P91 is an SIMD instruction to add the upper 32 bits of the register R0 and the upper 32 bits of the register R1 together, store the addition result in the upper 32 bits of the register R1, add the lower 32 bits of the register R0 and the lower 32 bits of the register R1 together, and store the addition result in the lower 32 bits of the register R1.

The instruction P92 is an SIMD instruction to add the upper 32 bits of the register R2 and the upper 32 bits of the register R1 and store the addition result in the upper 32 bits of the register R1.

The instruction P93 is a basic instruction to transfer the lower 32 bits of the register R1 to the lower 32 bits of the register R3.

The instruction P94 is a basic instruction to add the lower 32 bits of the register R1 and the constant "0x3" together and store the addition result in the lower 32 bits of the register R1.

The instruction P95 is a basic instruction to store the lower 32 bits of the register R3 in the location on a memory the address of which is indicated as the lower 32 bits of the register R4.

The instruction P96 is a basic instruction to transfer the constant "0x1234" to the lower 32 bits of the register R5.

The instruction P97 is a basic instruction to store the lower 32 bits of the register R5 in the location on the memory the address of which is indicated as the lower 32 bits of the register R6.

Here, an explanation of operations by the instruction scheduling unit 102 will be given.

The instruction scheduling unit 102 receives the program P90 as input. Then, the dependency analysis unit 110 is activated. The dependency analysis unit 110 generates a dependency graph G120 shown in FIG. 21 according to the program P90.

In this case, as mentioned earlier, the dependency analysis unit 110 considers the upper 32 bits and the lower 32 bits of a 64-bit register as different resources and detects dependency relations by referring to the reference storage resource table T100 that is stored in the compiling apparatus 200.

For instance, when analyzing the dependency relation between the instructions P92 and P93, the dependency analysis unit 110 considers the instruction P92 as an instruction to store data in the upper 32 bits of the register R1 and the instruction P93 as an instruction to refer to data in the lower 32 bits of the register R1. Since no dependency relation about the same resource is found between the instructions P92 and P93, the dependency analysis unit 110 considers that there is no dependency relation between the two instructions and generates no edge (arrow) between the two instructions in the dependency graph G120.

The independency graph G120 includes nodes N121 to N127 and edges E121 to E126. The nodes N121 to N127 correspond to the instructions P91 to P97, respectively. The edges E121 to E126 are directed edges. While the edge E123 indicates an antidependency relation, the other edges indicate data dependency relations.

The nodes N121 and N122 are connected via the edge E121, which is directed from the node N121 to the node N122. The nodes N121 and N123 are connected via the edge E122, from the node N121 to the node N123. The nodes N122 and N124 are connected via the edge E124, from the node N122 to the node N124. The nodes N123 and N124 are connected via the edge E123, from the node N123 to the node N124. The nodes N123 and N125 are connected via the edge E125, from the node N123 to the node N125. The nodes N126 and N127 are connected via the edge E126, from the node N126 to the node N127.

Figure 21:
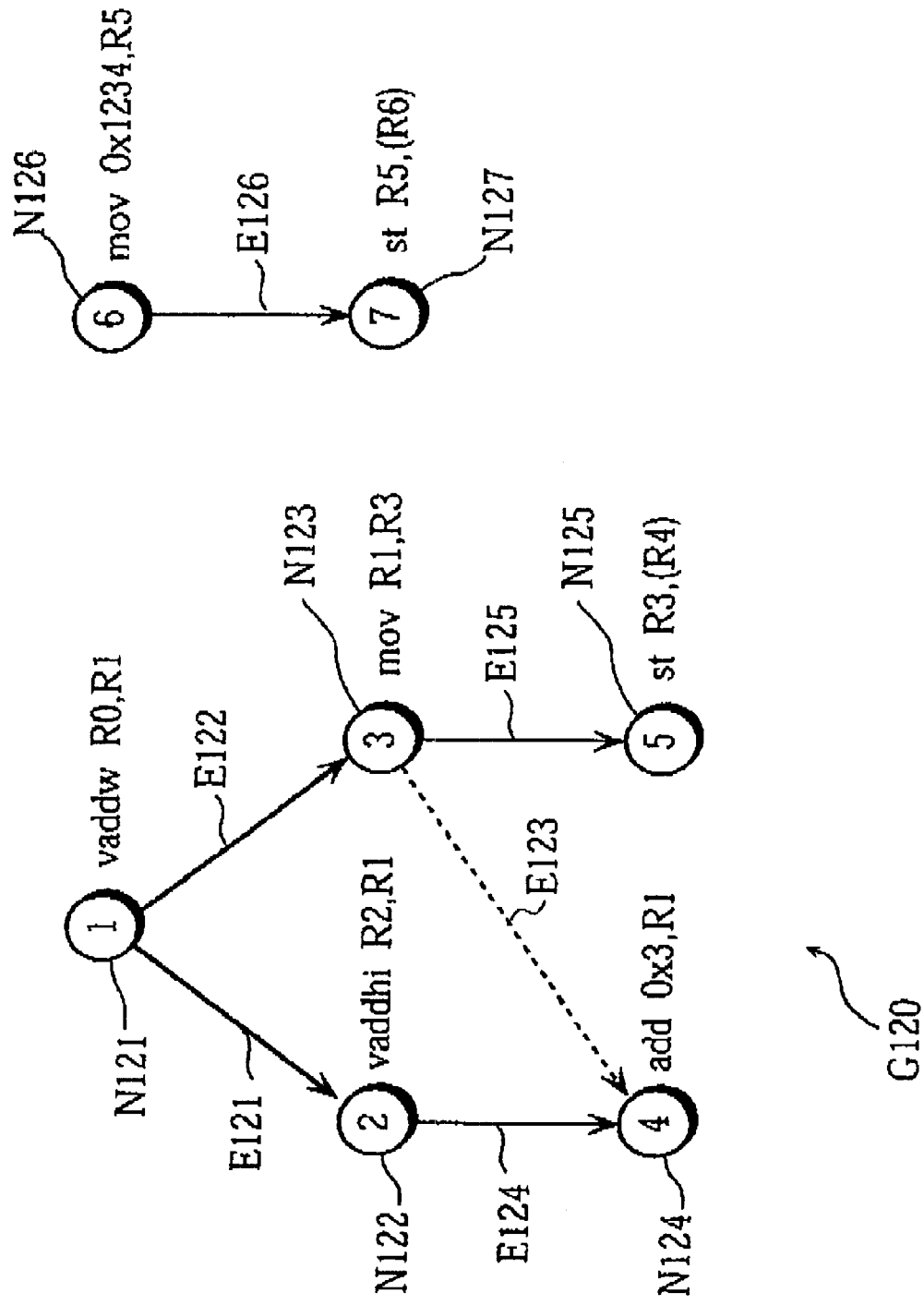
FIG. 21 visually shows a dependency graph G120, which has been generated by a dependency analyzing unit 110 according to the program P90.

Although FIG. 21 visually shows the dependency graph G120, note that a dependency graph is not a picture but a group of data composed of nodes and edges as in the case of the dependency graph G100.

Then, the instruction rearrangement unit 111 is activated. The instruction rearrangement unit 111 fixes a group of at least one instruction as arrangement nodes (an arrangement node) at step s10 every time loop 2, which is steps s3 to s9, in the flowchart in FIG. 19, is completed. This group is a group of instructions that can be executed in parallel in the same cycle, and is referred to an "execution group". Here, specific explanations of the execution groups will be given according to the steps of the flowchart in FIG. 19.

(Determining Execution Group 1)

The instruction rearrangement unit 111 generates an arrangement candidate group in which the nodes N121 and N126 are the prospective nodes since the nodes N121 and N126 has no predecessor at this point in time (step s2). Then, the node N121 is selected as the optimum node (step s4). Next, it is judged whether the node N121 can be arranged. Here, it is judged that the node N121 can be arranged (step s5), and the node N121 is provisionally arranged (step s6). Then, the instruction rearrangement unit 111 performs an arrangement state judgement. Here, it is judged that another node can be arranged (step s7). No arrangement candidate newly arises (step s8), so that the control is returned to the top of loop 2 (steps s9 and s3). Since the rearrangement candidate group still includes a node, the instruction rearrangement unit 111 repeats loop 2 (step s3 to s9).

Since the arrangement candidate group includes only the node N126, so that the instruction rearrangement unit 111 selects the node N126 as the optimum node (step s4). Then, the instruction rearrangement unit 111 judges whether the node N126 can be arranged. Here, it is judged that the node N126 can be arranged (step s5), and the node N126 is provisionally arranged in the provisional arrangement node group as the optimum node (step s6). Next, an arrangement state judgement is performed. Here, it is judged that another node can be arranged (step s7). No arrangement candidate newly arises (step s8), so that the control is returned to the top of loop 2 (steps s9 and s3). At this point in time, the arrangement candidate group includes no node, so that loop 2 is completed and the control is transferred to step s10. The instruction rearrangement unit 111 arranges the instructions in the provisional arrangement node group (step s10).

As has been described, the process for determining the first execution group is completed. Nodes that have not been arranged are still included in the dependency graph, so that the instruction rearrangement unit 111 repeats loop 1 (steps s10 and s1).

(Determining Execution Group 2)

At this point in time, since the nodes N122, N123, and N127 has no predecessor, the instruction rearrangement unit 111 generates another arrangement candidate group in which the prospective nodes are nodes N122, N123, and N127 (step s2). Then, the node N122 is selected as the optimum node (step s4). Next, it is judged whether the node N122 can be arranged. Here, it is judged that the node N122 can be arranged (step s5), and the node N122 is provisionally arranged (step s6). Then, the instruction rearrangement unit 111 performs an arrangement state judgement. Here, it is judged that another node can be arranged (step s7). No arrangement candidate newly arises (step s8), so that the processing returns to the top of loop 2 (steps s9 and s3). Since the arrangement candidate group still includes nodes, the instruction rearrangement unit 111 repeats loop 2 (step s3 to s9).

Next, the instruction rearrangement unit 111 selects the node N123 as the optimum node (step s4). Then, the instruction rearrangement unit 111 judges whether the node N123 can be arranged. Here, it is judged that the node N123 can be arranged (step s5), and the node N123 is provisionally arranged (step s6). Next, an arrangement state judgement is performed. Here, it is judged that another node can be arranged (step s7). No arrangement candidate newly arises (step s8), so that the control is returned to the top of loop 2 (steps s9 and s3). Since the arrangement candidate group still includes a node, the instruction rearrangement unit 111 repeats loop 2 (step s3 to s9).

Since the arrangement candidate group includes only the node N127, so that the instruction rearrangement unit 111 selects the node N127 as the optimum node (step s4). Then, the instruction rearrangement unit 111 judges whether the node N127 can be arranged. Here, it is judged that the node N127 can be arranged (step s5), and the node N127 is provisionally arranged in the provisional arrangement node group as the optimum node (step s6). Next, an arrangement state judgement is performed. Here, it is judged that any more node can be arranged since three instructions have been provisionally arranged that are the maximum number of instructions to be executed in parallel by the object processor (step s7). Loop 2 is interrupted and the control is transferred to step s10. The instruction rearrangement unit 111 arranges the instructions in the provisional arrangement node group (step s10).

As has been described, the process for determining the second execution group is completed. Nodes that have not been arranged are still included in the dependency graph, so that the instruction rearrangement unit 111 repeats loop 1 (steps s10 and s1).

(Determining Execution Group 3)

At this point in time, since the nodes N124 and N125 has no predecessor, the instruction rearrangement unit 111 generates another arrangement candidate group in which the prospective nodes are nodes N124 and N125 (step s2). The processing after step s2 is the same as in the case of the execute cycle 1 that has been described, so that no more explanation will be given here. In this way, the two nodes are arranged as the arrangement instructions of the third execution group.

Then, the execution boundary addition unit 112 is activated. The execution boundary addition unit 112 sets the parallel execution boundary information of the last instruction in each of the execution groups at "1" that have been arranged in the instruction rearrangement unit 111, and outputs a group of instructions to which the parallel execution boundaries have been added.

Next, the object code generating unit 103 is activated. The object code generating unit 103 converts the group of instructions that have been output from the execution boundary addition unit 112 into object codes, and writes the object codes in the object code storage unit 140 as a file.

Figure 22:
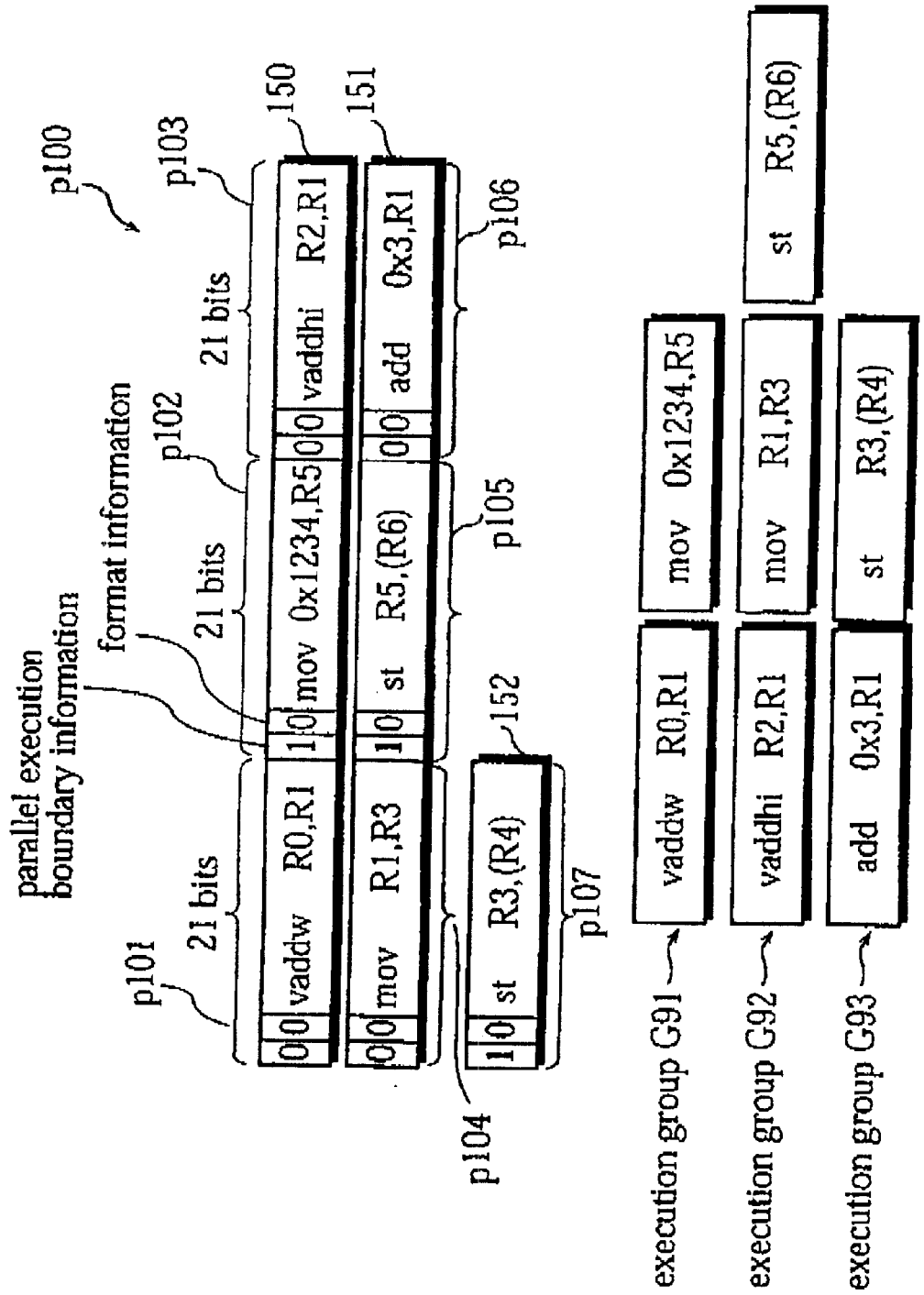
FIG. 22 shows execution codes and execution groups that have been generated by the compiling apparatus 200 and correspond to the program P90.

FIG. 22 shows the program P100, i.e., eventual execution codes that have been generated in this way and the order of execution. Note that the program is 64-bit strings though the program is described using mnemonics in FIG. 22.

The program P100 includes seven instructions, instructions P101 to P107, i.e., three packets, packets 150, 151, and 152 as instruction supply units. The packet 150 includes three instructions, the instructions P101 to P103, the packet 151 three instructions, the instructions P104 to P106, and the packet P152 one instruction, the instruction P107. Each of the instructions P101 to P107 includes parallel execution boundary information, format information, and instruction codes.

The instruction P101 corresponds to the instruction P91, the instruction P102 to the instruction P96, the instruction P103 to the instruction P92, the instruction P104 to the instruction P93, the instruction P105 to the instruction P97, the instruction P106 to the instruction P94, and the instruction P107 to the instruction P95.

The parallel execution boundary information in the instructions P102, P105, and P107 are all "1" and indicate parallel execution boundaries.

As has been described, three execution groups, execution groups G91, G92, and G93 are generated. The execution group G91 includes the instructions P91 and P96, the execution group G92 includes the instructions P92, P93, and P97, and the execution group G93 includes the instructions P94 and P95.

The execution groups G91, G92, and G93 are executed in this order. In the execution group G91, the instructions P91 and P96 are executed in parallel. In the execution group G92, the instructions P92, P93, and P97 are executed in parallel. In the execution group G93, the instructions P94 and P95 are executed in parallel.

2.4. Comparison with Conventional Compiling Apparatus

Here, the processing of the program P90 shown in FIG. 20 by a conventional compiling apparatus will be compared with the processing by the compiling apparatus 200 according to the present invention.

A conventional compiling apparatus also generates a dependency graph in a block for analyzing dependency relations. Unlike the present invention, however, the register names described in assembler codes are referred to, the whole of a register is considered as one resource, the information on the resource in which data is to be stored or data is to be referred to is obtained for each of the instructions, and the dependency relations of the instructions are detected according to the information.

Figure 23:
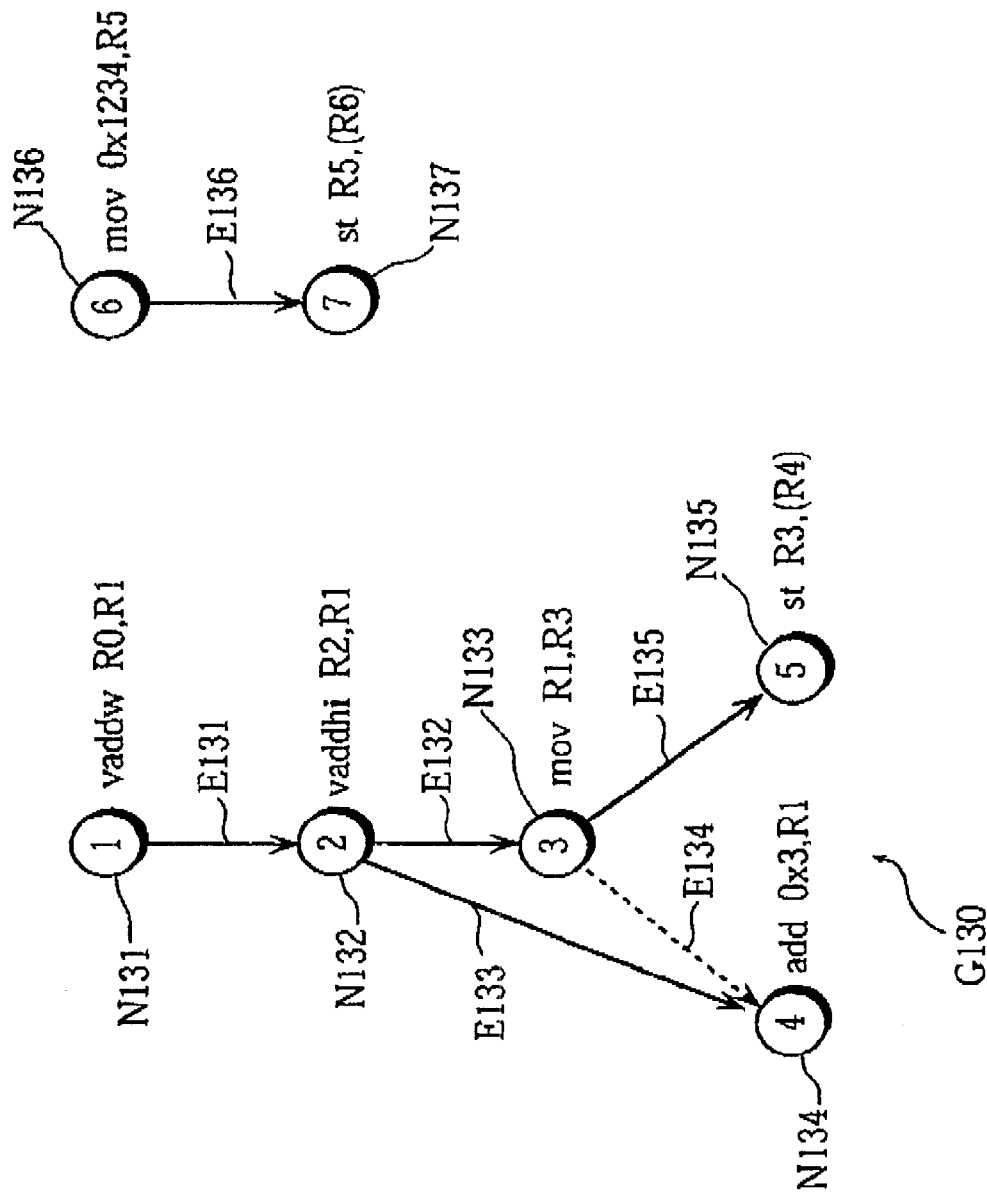
FIG. 23 visually shows a dependency graph G130, which has been generated by a conventional compiling apparatus and corresponds to the program P90.

For instance, when the dependency relation between the instructions P92 and P93, which are included in the program P90, is analyzed, the instruction P92 is recognized as the instruction to store data in the register R1 and the instruction P93 as the instruction to refer to data in the register R1. As a result, it is recognized that there is a data dependency relation between these two instructions about the register R1. In the dependency graph, an edge (arrow) corresponding to the data dependency relation is generated between two nodes corresponding to the two instructions. A dependency graph G130, which has been generated in this way, is shown in FIG. 23. The dependency graph G130 corresponds to the program P90 in FIG. 20.

The dependency graph G130 includes nodes N131 to N137 and edges E131 to E136. The nodes N131 to N137 correspond to the instructions P91 to P97, respectively. The edges 131 to E137 are directed edges. While the edges E134 indicates an antidependency relation, other edges indicate data dependency relations.

The nodes N131 and N132 are connected via the edge E131, which is directed from the node N131 to the node N132. The nodes N132 and N133 are connected via the edge E132, from the node N132 to the node N133. The nodes N132 and N134 are connected via the edge E133, from the node N132 to the node N134. The nodes N133 and N134 are connected via the edge E134, from the node N133 to the node N134. The nodes N133 and N135 are connected via the edge E135, from the node N133 to the node N135. The nodes N136 and N137 are connected via the edge E136, from the node N136 to the node N137.

Although FIG. 23 visually shows the dependency graph G130, note that a dependency graph is not a picture but a group of data composed of nodes and edges as in the case of the dependency graph G100.

Figure 24:
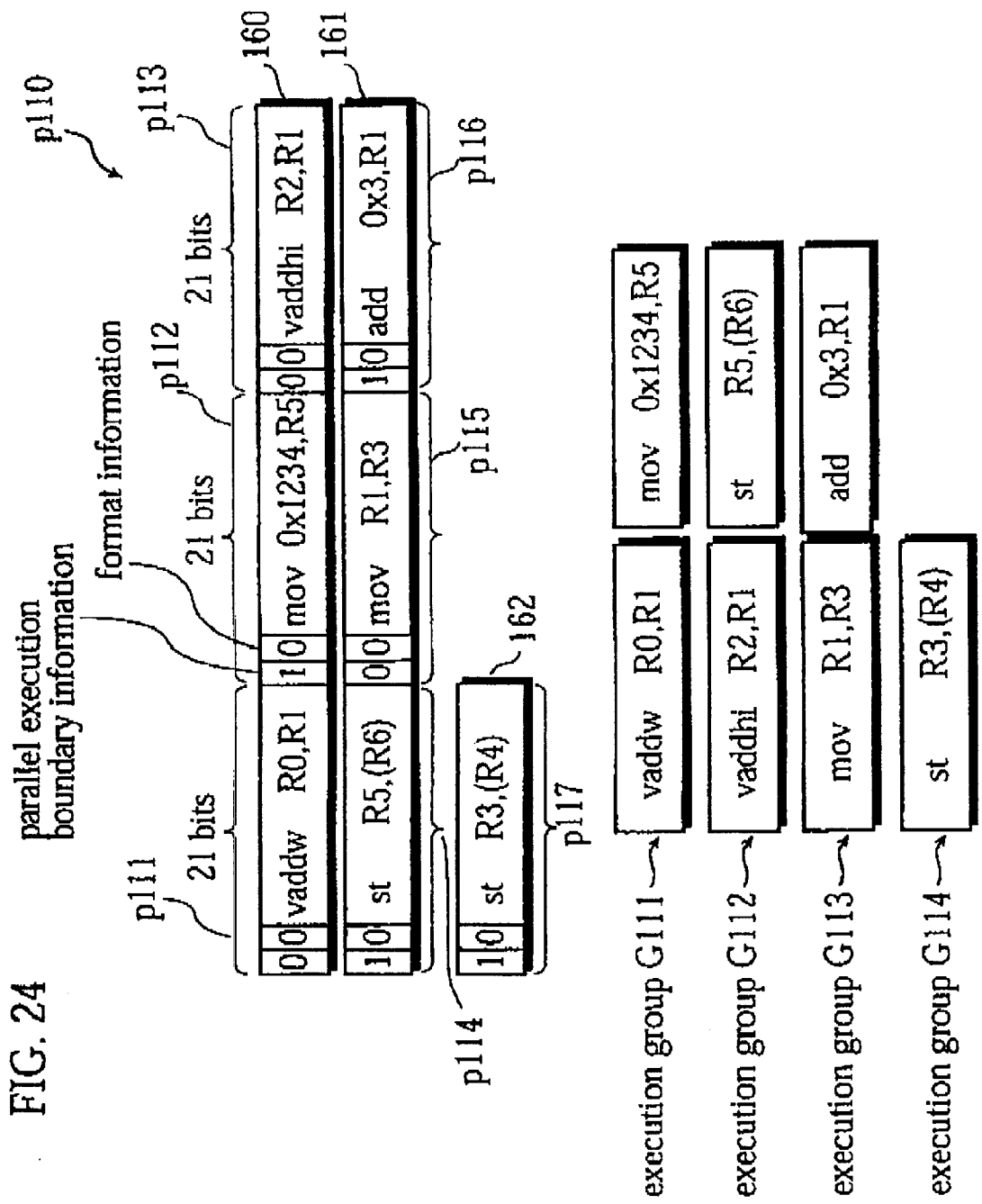
FIG. 24 shows a program P110, which is eventual execute codes generated by a conventional compiling apparatus, and the execution sequence.

FIG. 24 shows a program P110, which is eventual execute codes generated by a conventional compiling apparatus, and the execution sequence.

The program P110 includes seven instructions, instructions P111 to P117, i.e., three packets, packets 160, 161, and 162 as instruction supply units. The packet 160 includes, three instructions, the instructions P111 to P113, the packet 161 includes three instructions, the instructions P114 to P116, and the packet 162 includes one instruction, the instruction P117. Each of the instructions P111 to P117 includes parallel execution boundary information, format information, and instruction codes.

The instruction P111 corresponds to the instruction P91, the instruction P112 to the instruction P96, the instruction P113 to the instruction P92, the instruction P114 to the instruction P97, the instruction P115 to the instruction P93, the instruction P116 to the instruction P94, and the instruction P117 to the instruction P95.

The parallel execution boundary information in the instructions P114, P116, and P117 are all "1" and indicate parallel execution boundaries.

Four execution groups, execution groups G111, G112, G113, and G114 are generated. The execution group G111 includes the instructions P91 and P96, the execution group G112 includes the instructions P92 and P97, the execution group G113 includes the instructions P93 and P94, and the execution group G114 includes the instruction P95.

The execution groups G111, G112, G113, and G114 are executed in this order. In the execution group G111, the instructions P91 and P96 are executed in parallel. In the execution group G112, the instructions P92 and P97 are executed in parallel. In the execution group G113, the instructions P93 and P94 are executed in parallel. In the execution group G114, the instructions P95 is executed.

As clearly shown by the comparison of FIG. 22 and 24, the number of execution groups, i.e., the number of execute cycles for the compiling apparatus 200 of the present invention is smaller than that for the conventional compiling apparatus by one.

The number of execution groups is smaller for the compiling apparatus 200 of the present invention since the dependency analysis unit 110 analyzes the dependency relations between instructions using the areas of parts of registers and generates no edge (arrow) between two instructions in a dependency graph that have no data dependency relation.

II. The Second Embodiment

The processor 310 according to the first embodiment executes an instruction stream that has been generated by statically analyzing the dependency relations among a plurality of instructions when the compiling apparatus 200 has generated execution codes and by rearranging instruction codes according to the analysis. The processor 310 is a processor according to so-called static scheduling.

Here, an explanation of a processor 500 according to dynamic scheduling, in which hardware dynamically determines whether instructions can be executed in parallel, will be given. Note that the processor 500 is not illustrated.

The processor 500 is a superscalar model processor that execute up to three instructions in parallel.

The format of instructions analyzed and executed by the processor 500 differs from that in FIG. 2 in including no parallel execution boundary information. Instructions are supplied and issued for the processor 500 in the same manner as in the case of the processor 310. On the other hand, the processor 500 itself detects the instruction to which instructions can be issued in each cycle and controls issuance of instruction since the instructions for the processor 500 includes no parallel execution boundary information.

1.1. Structure of Processor 500

The hardware structure of the processor 500 is almost the same as that of the processor 310. The hardware structure of the processor 500 differs from that of the processor 310 in the manner of controlling the issuance of instructions. The explanation given below will focus on the points in which the processor 500 differs from the processor 310.

The different points are the instruction register 23, the instruction decoder 32, the instruction issuance control unit 31 in FIG. 4, and their peripheral elements.

For the processor 310, it is statically analyzed by the compiling apparatus whether instructions can be executed in parallel and the format of instruction consequently includes parallel execution boundary information. As a result, the instruction issuance control unit 31 reads parallel execution boundary information and format information (four bits of information in total) that are included in each of the instruction registers A231 and B232 as shown in FIG. 6 and outputs non-operation instruction flags to the second and third instruction decoders 34 and 35. As has been described, the processor 310 has a simple structure. On the other hand, it is analyzed in an instruction issuance control unit 171, which will be described later, whether instructions can be executed in parallel for the processor 500 according to the second embodiment.

Figure 25:
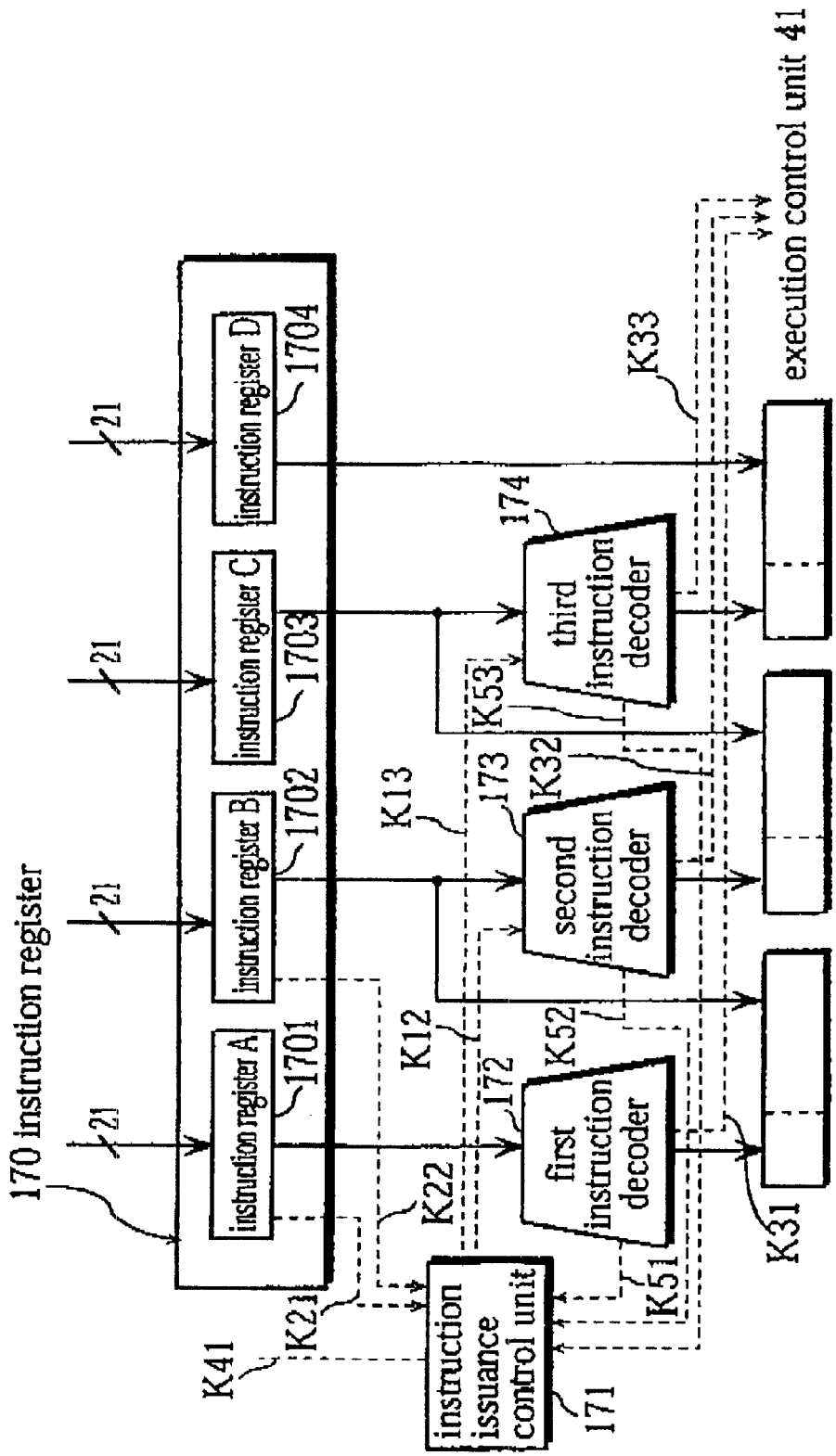
FIG. 25 is a block diagram of the structure of an instruction register 170 and the peripheral elements in a processor 500 as the another embodiment of the present invention.

FIG. 25 is a block diagram of the structure of an instruction register 170 and the peripheral elements in a processor 500 according to the present invention.

The processor 500 includes the instruction register 170, the instruction issuance control unit 171, and an instruction decoder 175 (not illustrated) instead of the instruction register 23, the instruction issuance control unit 31, and the instruction decoder 32 in the processor 310.

The instruction register 170 includes instruction registers A1701, B1702, C1703, and D1704.

The instruction decoder 175 includes first, second, and third instruction decoders 172, 173, and 174.

The instruction issuance control unit 171 reads the format information included in the units that are stored in the instruction registers in the instruction register 170 and receives decoding results from the first, second, and third instruction decoders 172, 173, and 174. Then, the instruction issuance control unit 171 judges whether the instructions stored in the instruction registers A1701, B1702, C1703, and D1704 can be executed in parallel, and outputs non-operation instruction flags that have been set as "1" to the second and third instruction decoders 173 and 174 according to the judgement. In other words, the results of decoding by the instruction decoders are made invalid. Then, the control signal of each of the instructions is transferred to the execution control unit 41 from each of the instruction decoders.

More specifically, the instruction issuance control unit 171 reads the format information of the units that are stored in the instruction registers A1701 and B1702 via the control signal lines K21 and K22. When the format information of the unit in the instruction register A1701 is "1", the non-operation instruction flag that is to be output to the second instruction decoder 173 is set as "1" and the non-operation instruction flag is output to the second instruction decoder 173 via the control signal line K12. On the other hand, when the format information of the unit in the instruction register A1701 is "0" and the format information of the unit in the instruction register 31702 is "1", the non-operation instruction flag that is to be output to the third instruction decoder 174 is set as "1" and the non-operation instruction flag is output to the third instruction decoder 174 via the control signal line K13.

In parallel with these operations, the instruction issuance control unit 171 receives the results of decoding by the instruction decoders 172 to 174 via the control signal lines K51 to K53 and judges whether the instructions can be executed in parallel.

More specifically, the instruction issuance control unit 171 obtains information on the register and the part of the register in which this instruction (the instruction indicated by the op code and operand of the result of decoding by the first instruction decoder 172, referred to a "first instruction" in this specification) is to store data, and information on the register and the part of the register in which this instruction is to refer to data according to the op code and operand. The instruction issuance control unit 171 has the same table as the reference storage resource table T100. The instruction issuance control unit 171 considers the upper and lower 32 bits of a 64-bit register as different resources and judges whether data is referred to or stored in each of the resources according to the op code using the table.

Next, the instruction issuance control unit 171 refers to the decoding result when another instruction decoder effectively decodes an instruction.

More specifically, when the non-operation instruction flag that is to be output to the second instruction decoder 173 is not set as "1", the result of decoding by the second instruction decoder 173 (here, the decoded instruction is referred to the "second instruction") is referred to and information on resources in which data is to be referred to and stored is obtained as in the case of the first instruction.

Meanwhile, when the non-operation instruction flag that is to be output to the second instruction decoder 173 is set as "1" and the non-operation instruction flag that is to be output to the third instruction decoder 174 is not set as "1", the result of decoding by the third instruction decoder 174 (here, the decoded instruction is referred to as the "third instruction") and information on resources in which data is to be referred to and stored is obtained as in the case of the first instruction.

Here, the information on resources in which data is to be referred to and stored is the same as information that the compiling apparatus 200 obtains from the reference storage resource table T100.

According to the information of the first and second instructions on resources in which data is to be referred to and stored, it is judged whether there is a data dependency relation between the two instructions. When there is a data dependency relation, the second instruction cannot be executed in parallel with the first instruction, so that the non-operation instruction flags for the instruction decoder for decoding the second instruction and the following decoder are set as "1" and are output to the corresponding instruction decoders.

Similarly, the presence of the third instruction is detected. When the third instruction is present, the data dependency relations between the first and third instructions and between the second and third instructions are analyzed. When these data dependency relations are present, the non-operation instruction flag for the instruction decoder for decoding the third instruction is set as "1" and is output to the corresponding instruction decoder. Then, the corresponding instruction decoder of an instruction that cannot be executed in the cycle transfers a control signal including the non-operation instruction flag to the execution control unit 41.

Finally, the instruction issuance control unit 171 transfers the information on the number of units that have been issued in this cycle to the instruction buffer 22 via the control signal line K41. According to the information, the instruction buffer 22 changes the indication of the valid units in the instruction buffer so that newly valid units are indicated.

1.2. Operations by the Processor 500

Here, an explanation of operations by the processor 500 will be given using a specific example. As an example, the program P90 that is described in the assembler codes shown in FIG. 20 is used. The program P90 is assembler codes that have been output from an assembler. (assembling device).

Figure 26:
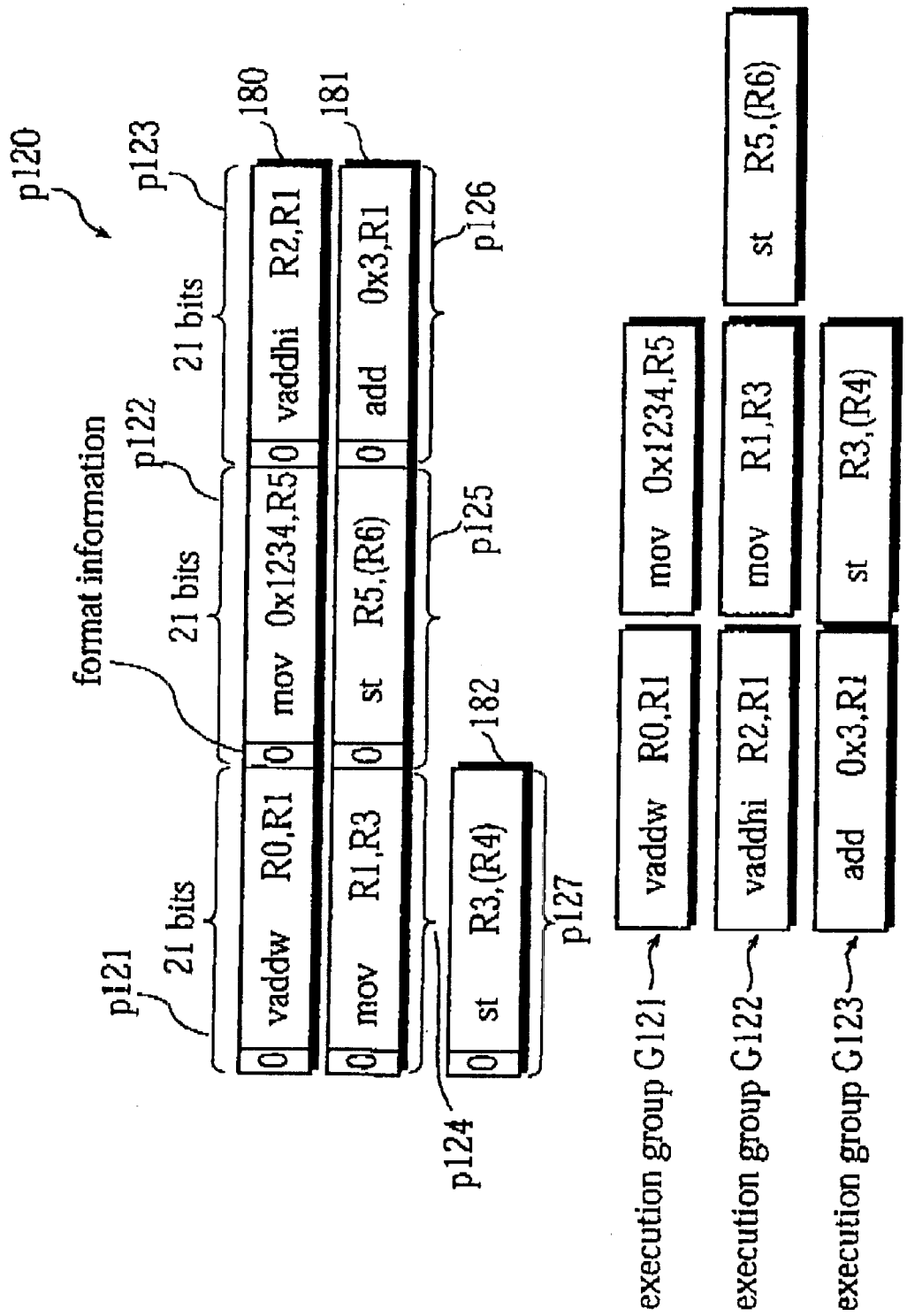
FIG. 26 shows a program P120, in which the instructions have been rearranged by the compiling apparatus corresponding to the processor 500, and instructions executed in the cycles.
Figure 27:
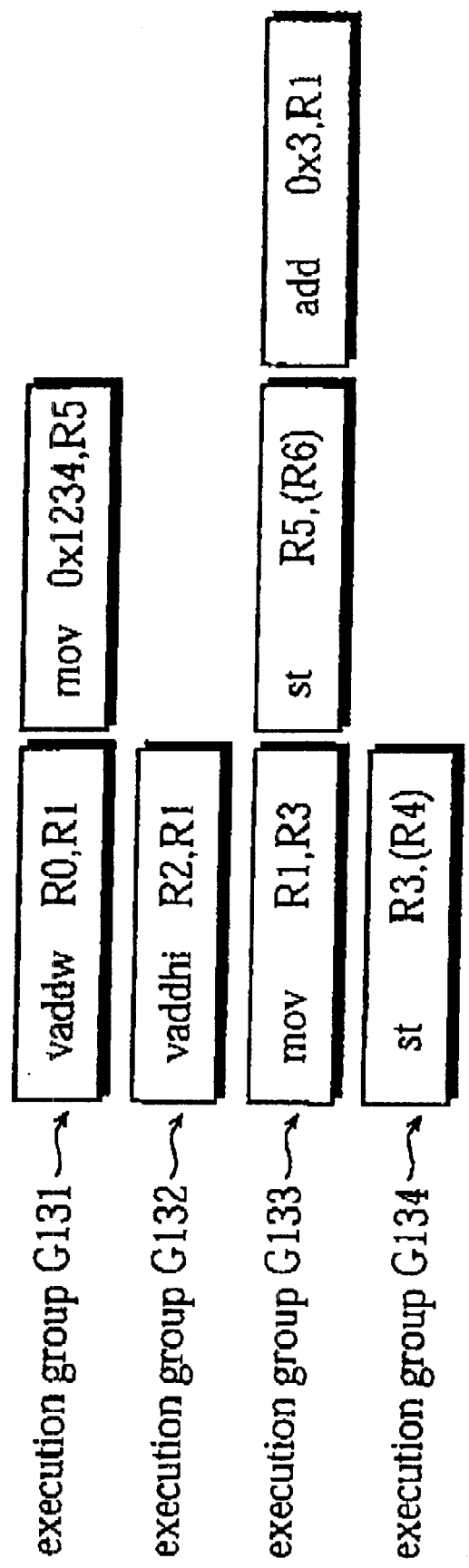
FIG. 27 shows the cycles when the program P120 is executed by a conventional processor.

In the program P90, the instructions are rearranged by the compiling apparatus corresponding to the processor 500. The instruction rearrangement is performed so that as many number of instructions as possible are executed in parallel in line with operations by the instruction issuance control unit 171. The instructions in the program P90 are rearranged and packed in 64-bit packets by the compiling apparatus to be a program P120 (described in execution codes) as shown in FIG. 26.

The program P120 includes seven instructions, instructions P121 to P127, i.e., three packets, packets 180, 181, and 182 as instruction supply units. The packet 180 includes three instructions, the instructions P121 to P123. The packet 181 includes three instructions, the instructions P124 to P126. The packet 182 includes one instruction, the instruction P127. Each of the instructions P121 to P127 includes parallel execution boundary information, format information, and instruction codes.

The instruction P121 corresponds to the instruction P91, the instruction P122 to the instruction P96, the instruction P123 to the instruction P92, the instruction P124 to the instruction P93, the instruction P125 to the instruction P97, the instruction P126 to the instruction P94, and the instruction P127 to the instruction P95.

Here, an explanation of operations in each of the cycles will be given when the processor 500 executes the program P120 shown in FIG. 26, which is execution codes.

(Operations in the First Cycle)

The packet 180 is supplied from the memory, and the three units in the packet 180 are transferred to the instruction register 170 in order. More specifically, the instruction P121 (including the instruction "vaddw") is transferred to the instruction register A1701, the instruction P122 (including the instruction "mov") to the instruction register A1702, and the instruction P123 (including the instruction "vaddhi") to the instruction register C1703.

Then, the instruction issuance control unit 171 controls the issuance of instructions in the manner given below.

First, the instruction issuance control unit 171 refers to the format information that is stored in each of the instruction registers, and sets a non-operation instruction flag for an appropriate instruction decoder. The format information of the units stored in the three instruction registers are all "0", so that no control is performed according to format information.

Then, the instruction issuance control unit 171 refers to the result of decoding by each of the instruction decoders to obtain information on the resources that are to be referred to and instructions are to be stored in.

More specifically, the instruction issuance control unit 171 judged that the instruction "vaddw" included in the instruction P121 indicate to refer to the upper and lower 32 bits of the registers R0 and R1 and to store data in the upper and lower 32 bits of the register R1. The instruction issuance control unit 171 judged that the instruction "mov" included in the instruction P122 indicates to store data in the lower 32 bits of the register R5 and that the instruction "vaddhi" included in the instruction P123 indicates to refer to the upper 32 bits of the registers R2 and R1 and to store data in the upper 32 bits of the register R1.

Then, the instruction issuance control unit 171 judged whether there is data dependency relations between the instructions.

More specifically, there is no data dependency relation between the instruction "vaddw" included in the instruction P121 and the instruction "mov" in the instruction P122, so that the instruction issuance control unit 171 judges that the instructions P121 and P122 can be executed in parallel. Then, judging that there is a data dependency relation between the instruction "vaddw" included in the instruction P121 and the instruction "vaddhi" in the instruction P123 concerning the upper 32 bits of the register R1, the instruction issuance control unit 171 judges that the instruction "vaddhi" cannot issued in this cycle. As a result, the instruction issuance control unit 171 sets the non-operation instruction flag to be output to the third instruction decoder 174 as "1" and outputs the non-operation instruction flag to the third instruction decoder 174.

As a result of the control by the instruction issuance control unit 171, the instruction "vaddw" in the instruction P121 and the instruction "mov" in the instruction P122 are issued in this cycle. Then, the instruction issuance control unit 171 sends the information that two units have been issued to the instruction buffer 22. The instruction "vaddhi" in the remaining instruction P123 is stored in the instruction buffer 22.

The executing unit 40 independently performs addition for the upper and lower resources of the registers R0 and R1, stores the results of the additions in the upper and lower resources of the register R1, and transfers the constant "0x1234" to the lower 32 bits of the register R5.

(Operations in the Second Cycle)

The packet 181 is provided from the memory and the instruction "vaddhi" stored in the instruction buffer 22 and each of the units in the packet 181 are transferred to the register 170 in order. More specifically, the instruction "vaddhi" in the instruction P123 is stored in the instruction register A1701 and each of the units in the packet 181 including the instruction "mov" in the instruction P124 is stored in the instruction registers B1702 to D1704 in order.

Then, the instruction issuance control unit 171 controls the issuance of instruction.

More specifically, the format information of all the units in the instruction registers are "0" as in the case of the first cycle, so that the instruction issuance control unit 171 does not control using the format information, Then, the instruction issuance control unit 171 refers to the result of the decoding by each of the instruction decoders and obtains the information on the resources in which the instructions stores and refers to data. As in the case of the first cycle, the data dependency relations between the instructions are analyzed.

In this case, although the destination register of the instruction "vaddhi" included in the instruction P123 is the register R1 and the source register of the instruction "mov" in the instruction P124 is also the register R1, the instruction "vaddhi" instructs to store data in only the upper 32 bits of the register R1 and the instruction "mov" instructs to refer to the data in only the lower 32 bits of the register R1. As a result, the instruction issuance control unit 171 judges that there is no data dependence relation between these instructions. Similarly, it is judged that there is no data dependency relations between the instruction "st" and these two instructions. In this cycle, all the results of decoding by the three instruction decoders are effective and three instructions are issued. Next, the instruction issuance control unit 171 sends the information that the three units have been issued to the instruction buffer 22. The instruction "add" in the remaining instruction P126 is stored in the instruction buffer 22.

The executing unit 40 adds the upper 32 bits of the registers R2 and R1 together, stores the result in the upper 32 bits of the register R1, transfers the lower 32 bits of the register R1 to the lower 32 bits of the register R3, and transfers the lower 32 bits of the register R5 to the location on the memory whose address is indicated by the lower 32 bits of the register R6.

(Operations in the Third Cycle)

The packet 182 is provided from the memory and the instruction "add" (included in the instruction P126) stored in the instruction buffer 22 and the instruction "st" (included in the instruction P127), which is the unit in the packet 182, are transferred to the instruction register 170 (i.e., the instruction registers A1701 and B1702) in order.

As in the case of the cycles that have been described, the instruction issuance control unit 171 performs control. In this cycle, the two instructions that have been transferred to the instruction register 170 are simultaneously issued. As a result, the provided unit is issued.

The execution unit 40 adds the constant "0x3" to the lower 32 bits of the register R1, stores the result of the addition to the lower 32 bits of the register R1, and transfers the lower 32 bits of the register R3 in the location on the memory whose address is indicated by the lower 32 bits of the register R4.

The cycles G121, G122, and G133 that are to be actually executed by the processor 500 are shown in FIG. 26. The cycle G121 includes the instructions P121 and P122, the cycle G122 includes the instructions P123, P124, and P125, and the cycle G123 includes the instructions P126 and P127.

As has been described, the processor 500 executes the program P120 (execution codes) shown in FIG. 26 in three cycles.

Here, the cases when the program P120 is executed by the processor 500 and a conventional processor are compared.

The conventional processor operates similarly to the processor 500 in the first cycle.

At the second cycle, when judging the data dependency relation between the instruction "vaddhi" included in the instruction P123 that is stored in the instruction register A and the instruction "mov" in the instruction P124 that is stored in the instruction register B, the conventional processor refers to the register numbers in the instruction codes, considers the whole of a register as one resource, and obtains the information on the resources in which the instructions store and refer to data. More specifically, it is judged that the instruction "vaddhi" is an instruction to refer to the registers R2 and R1 and to store data in the register R1 and that the instruction "mov" is an instruction to refer to the register R1 and to store data in the register R3. By doing so, it is judged that there is a data dependency relation between the two instructions concerning the register R1 and the two instructions are not executed in parallel. In other words, only the instruction "vaddhi" is issued in this cycle.

As a result, the execution of the program P120 in FIG. 26 by the conventional processor requires four cycles, i.e., cycles G131 to G134. The cycle G131 includes the instructions P121 and P122, the cycle G132 includes the instruction P123, the cycle G133 includes the instructions P124, P125, and P126, and the cycle G134 includes the instruction P127.

As has been described, the conventional processor requires one more cycle compared with the processor 500 according to the present invention. However the instructions in the program P120 (execution codes) are rearranged by the compiling apparatus, the conventional processor cannot execute the codes in less than four cycles.

III. Other Possible Modifications

While the explanations of the processor and the compiling apparatus according to the present invention have been given according to the embodiments, the present invention is not limited to these embodiments. Other possible modifications are given below.

(1) In the compiling apparatus in the first embodiment, the dependency analysis unit 110 refers to the reference storage resource table T100 and analyzes data dependency relations between instructions concerning parts of registers. The compiling apparatus, however, is not limited to the structure.

Figure 19:
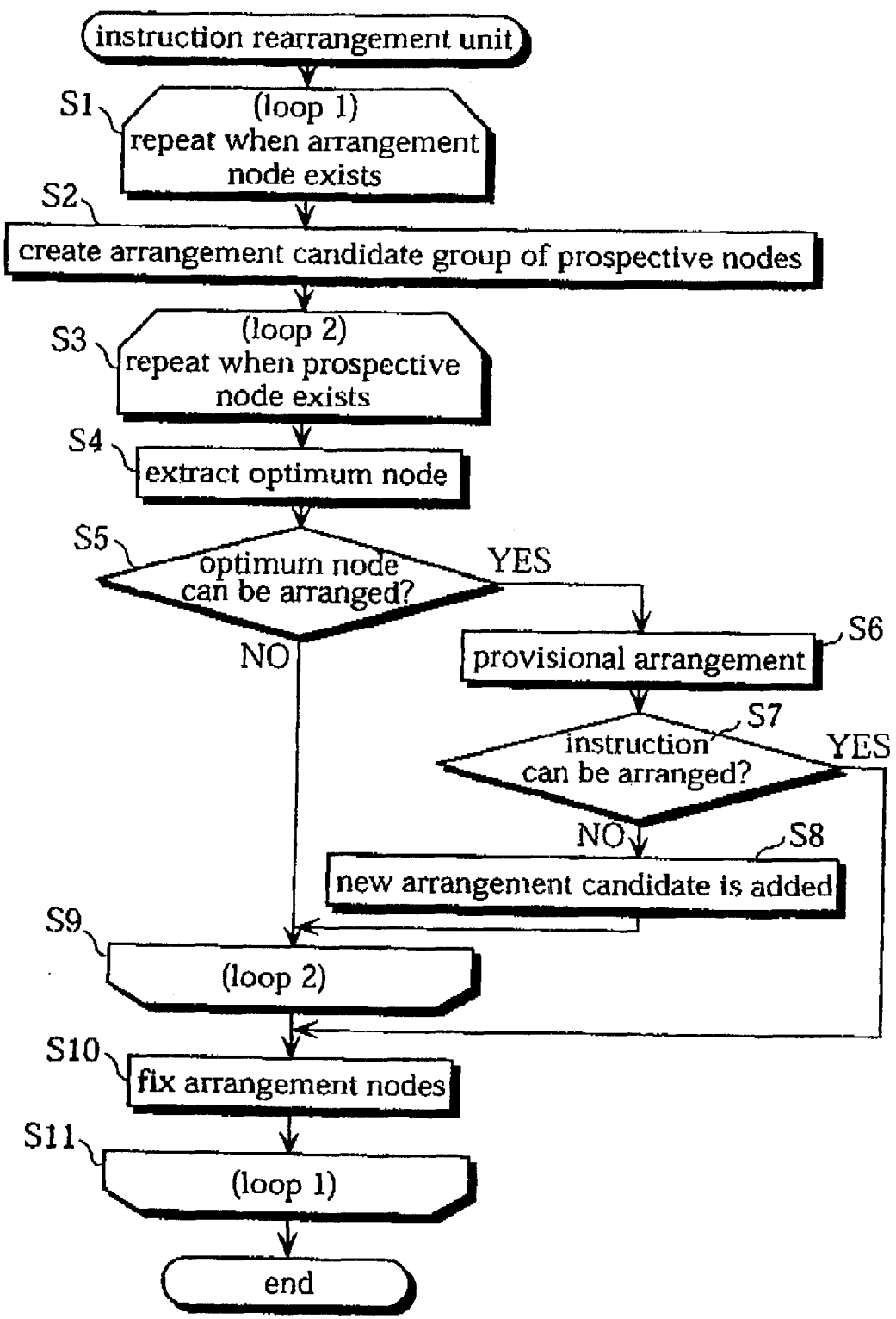
FIG. 19 is a flowchart showing processing by an instruction rearrangement unit 111 in detail.

When generating an arrangement candidate group at step s2 in the flowchart shown in FIG. 19, the instruction rearrangement unit 111 may refer to the reference storage resource table T100 to obtain a group of instructions that are not dependent on other instructions.

Also in this case, data dependency relations can be detected in which parts of registers are considered as resources, so that prospective nodes can be detected more strictly and the possibility of parallel execution is enhanced compared with a conventional manner. As a result, the number of execute cycles in the object processor decreases and the same effect of the embodiments can be obtained.

(2) In the processors and compiling apparatus in the embodiments, a register is divided into two parts, the upper part and lower part to be dealt with as different resources. The present invention, however, is not limited to this dividing method. A register may be divided into more than two parts. The bit length of divided parts may be different. For this purpose, only the structure of the register file and the peripheral elements shown in FIG. 11 must be changed according to the division for the processor. For the instruction scheduling unit in the compiling apparatus and the instruction issuance control unit in the superscalar processor, only the reference storage resource table T100 in FIG. 18 must be changed according to the change.

(3) When a plurality of instructions are to write in the same part of the same register in the same cycle in the processors of the embodiments, the register writing control unit 431 controls so that the writing of the execute result of the instruction is given the highest priority that comes later in the order of the program. The present invention, however, is not limited to this priority level assignment. For instance, the priority level for the writing of the execute result of an instruction may be assigned according to the kind of the operation that has been designated by the instruction. More specifically, the register writing control unit 431 stores the priority level for each kind of instruction in advance, reads the priority levels for the plurality of instructions, and determines that data is stored in the part of the register for the instruction which has the highest priority level.

(4) While three instructions are executed in parallel in the processors of the embodiments, the number of instructions executed in parallel is not limited to three in the present invention. For instance, two instructions or more than three instructions may be simultaneously issued.

(5) While variable-length instructions are executed in the processors of the embodiments, the present invention is not limited to this instruction format. Fixed-length instruction format may be adopted. In this case, the same effects can be obtained.

(6) The present invention may be a compiling method that includes the procedures which have been described in the embodiments. The present invention may also be a compile program that has a computer realize the compiling method and digital signals composed of the compile program. In addition, the present invention may be a computer-readable recording medium such as a floppy disk, a hard disk, a CD-ROM, an MO (Magneto-Optical Disc), and a DVD storing the compile program. Furthermore, the present invention may be a compile program that is transmitted via networks such as the Internet.

(7) The present invention may be a computer-readable recording medium such as a floppy disk, a hard disk, a CD-ROM, an MO, a DVD, and a semiconductor memory storing execution codes that have been generated by the compiling apparatus of the embodiments.

(8) The present invention may be the combination of the embodiments, the modifications, and parts of the embodiments and the modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A processor that processes a plurality of instructions in one cycle, comprising:

A) a register;

B) instruction fetching means for fetching the plurality of instructions that include at least a first instruction and a second instruction from an external program, the first instruction including a first access indication for accessing a first area, which is at least part of an area in the register, the second instruction including a second access indication for accessing a second area, which is at least part of the area in the register, wherein when the first area is a whole of the register, the second area is the part of the register, when the second area is the whole of the register, the first area is the part of the register, and at least one of the first and second access indications is for storing data in at least the part of the register;

C) decoding means for decoding each of the fetched instructions and outputting at least decoded information on the register and on areas in the register in one cycle, the decoded information including at least information on the register and on the first and second areas; and D) access means for accessing the first and second areas according to the decoded information in one cycle.

2. The processor according to claim 1, wherein each of the instructions includes parallel execution information indicating whether the instruction is executed in parallel with another instruction, and the decoding means includes:

A) an instruction issuance control unit for selecting a group containing at least one instructions that are to be executed in one cycle from the fetched instructions according to the parallel execution information included in the fetched instructions; and B) an instruction decoding unit for decoding the instructions in the group and stopping decoding other instructions that are not included in the group but are included in the fetched instructions.

3. The processor according to claim 2, wherein the decoded information includes an op code, the processor further comprising operation means for performing one of an operation and memory access for each of the instructions in the group according to the op code and information on the register and on the areas in the register included in the decoded information, and for generating operation information in one cycle, the operation information including first operation information by the first instruction and second operation information by the second instruction, wherein the access means, which stores data in the register, includes:

a) a first selecting unit for selecting one of the first operation information, the second operation information, and operation information by another instruction in the group and writing information in the selected operation information corresponding to the first area in the first area;

b) a second selecting unit for selecting one of the first operation information, the second operation information, and operation information by another instruction in the group and writing information in the selected operation information corresponding to the second area in the second area; and c) a register writing control unit for controlling the first selecting unit so that the first selecting unit selects the first operation information and writes the first operation information in the first area according to information on the register and on the first area included in the decoded information, and controlling the second selecting unit so that the second selecting unit selects the second operation information and writes the second operation information in the second area according to information on the register and on the second area included in the decoded information in one cycle.

4. The processor according to claim 2, wherein
the first area, which is an object of the first access indication, and the second area, which is an object of the second access indication, are parts of the register and have no overlap,
the first instruction includes an indication for storing data in the first area and the second instruction includes an indication for referring to data in the second area, and
the access means stores data in the first area and refers to data in the second area in one cycle.

5. The processor according to claim 4, wherein
the decoded information includes an op code,
the processor further comprising
operation means for performing one of an operation and memory access for each of the instructions in the group according to the op code and information on the register and on the areas in the register included in the decoded information, and for generating operation information in one cycle, the operation information including first operation information by the first instruction and second operation information by the second instruction,
wherein the access means, which stores data in the register, includes:
 a) a first selecting unit for selecting one of the first operation information, the second operation information, and operation information by another instruction in the group and writing information in the selected operation information corresponding to the first area in the first area;
 b) a second selecting unit for selecting one of the first operation information, the second operation information, and operation information by another instruction in the group and writing information in the selected operation information corresponding to the second area in the second area; and
 c) a register writing control unit for controlling the first selecting unit so that the first selecting unit selects the first operation information and writes the first operation information in the first area according to information on the register and on the first area included in the decoded information, and controlling the second selecting unit so that the second selecting unit selects the second operation information and writes the second operation information in the second area according to information on the register and on the second area included in the decoded information in one cycle.

6. The processor according to claim 2, wherein
the first area, which is an object of the first access indication, and the second area, which is an object of the second access indication, are parts of the area in the register and have no overlap,
the first instruction includes an indication for storing data in the first area and the second instruction includes an indication for storing data in the second area, and
the access means stores data in the first and second areas in one cycle.

7. The processor according to claim 6, wherein
the decoded information includes an op code,
the processor further comprising
operation means for performing one of an operation and memory access for each of the instructions in the group according to the op code and information on the register and on the areas in the register included in the decoded information, and for generating operation information in one cycle, the operation information including first operation information by the first instruction and second operation information by the second instruction,
wherein the access means, which stores data in the register, includes:
 a) a first selecting unit for selecting one of the first operation information, the second operation information, and operation information by another instruction in the group and writing information in the selected operation information corresponding to the first area in the first area;
 b) a second selecting unit for selecting one of the first operation information, the second operation information, and operation information by another instruction in the group and writing information in the selected operation information corresponding to the second area in the second area; and
 c) a register writing control unit for controlling the first selecting unit so that the first selecting unit selects the first operation information and writes the first operation information in the first area according to information on the register and on the first area included in the decoded information, and controlling the second selecting unit so that the second selecting unit selects the second operation information and writes the second operation information in the second area according to information on the register and on the second area included in the decoded information in one cycle.

8. The processor according to claim 2, wherein
the first area, which is an object of the first access indication, and the second area, which is an object of the second access indication, have an overlap, which is a third area,
the first instruction includes an indication for storing data in the first area and the second instruction includes an indication for storing data in the second area, and
the access means stores data in the first area excluding the third area, the second area excluding the third area, and the third area in one cycle.

9. The processor according to claim 8, wherein the access means determines that data is stored in the third area according to one of the first and second instructions that is positioned later in the program.

10. The processor according to claim 8, wherein the access means stores priority levels for kinds of instruction in advance and determines which one of the first and second instructions instructs to store data in the third area using the priority levels.

11. The processor according to claim 8, wherein
the decoded information includes an op code,
the processor further comprising
operation means for performing one of an operation and memory access for each of the instructions in the group according to the op code and information on the register and on the areas in the register included in the decoded information, and for generating operation information in one cycle, the operation information including first operation information by the first instruction and second operation information by the second instruction,
wherein the access means, which stores data in the register, includes:
 a) a first selecting unit for selecting one of the first operation information, the second operation information, and operation information by another instruction in the group and writing information in the selected operation information corresponding to the first area in the first area;

b) a second selecting unit for selecting one of the first operation information, the second operation information, and operation information by another instruction in the group and writing information in the selected operation information corresponding to the second area in the second area; and c) a register writing control unit for controlling the first selecting unit so that the first selecting unit selects the first operation information and writes the first operation information in the first area according to information on the register and on the first area included in the decoded information, and controlling the second selecting unit so that the second selecting unit selects the second operation information and writes the second operation information in the second area according to information on the register and on the second area included in the decoded information in one cycle.

12. The processor according to claim 1, wherein the decoding means includes:

A) an instruction decoding unit for decoding a plurality of instructions of the fetched instructions and outputting at least decoded information on the register and on areas in the register in one cycle, the decoded information according to indications for decoding instructions, the instruction decoding unit for stopping decoding an instruction in the fetched instructions according to an indication for stopping decoding the instruction in one cycle, wherein
the plurality of fetched instructions include at least the first and second instructions, and
wherein the decoded information includes at least the information on the register and on the first and second areas; and B) an instruction issuance control unit for controlling the instruction decoding unit by outputting an indication for decoding an instruction for each of the fetched instructions in one cycle so that the instruction decoding unit decodes the fetched instructions, the instruction issuance control unit for controlling the instruction decoding unit by receiving the decoded information that includes at least the information on the register and on the first and second areas after the instruction decoding unit decodes the fetched instructions, by judging whether the first and second areas are the same area, and by outputting an indication for stopping decoding the second instruction to the instruction decoding unit when it is judged that the first and second areas are the same area so that the instruction decoding unit stops decoding the second instruction.

13. The processor according to claim 12, wherein the instruction issuance control unit includes A) a reference storage resource table that includes a plurality of sets, each of the sets including a kind of instruction and areas in which an instruction of the kind refers to and stores data, and wherein the instruction issuance control unit obtains information on an area in the register included in a fetched instruction from the decoded information using the reference storage resource table for each of the fetched instructions.

14. The processor according to claim 13, wherein the decoded information includes an op code, the processor further comprising
operation means for performing one of an operation and memory access for each of the instructions in the group according to the op code and information on the register and on the areas in the register included in the decoded information, and for generating operation information in one cycle, the operation information including first operation information by the first instruction and second operation information by the second instruction, wherein the access means, which stores data in the register, includes:

a) a first selecting unit for selecting one of the first operation information, the second operation information, and operation information by another instruction in the group and writing information in the selected operation information corresponding to the first area in the first area;

b) a second selecting unit for selecting one of the first operation information, the second operation information, and operation information by another instruction in the group and writing information in the selected operation information corresponding to the second area in the second area; and c) a register writing control unit for controlling the first selecting unit so that the first selecting unit selects the first operation information and writes the first operation information in the first area according to information on the register and on the first area included in the decoded information, and controlling the second selecting unit so that the second selecting unit selects the second operation information and writes the second operation information in the second area according to information on the register and on the second area included in the decoded information in one cycle.

15. A compiling apparatus that generates object codes from a source program described in a high-level language, comprising:

A) storage means for storing the source program;

B) execution code generating means for reading the source program from the storage means and performing translation processing on the read source program to generate an executive program, the executive program including at least one executive instruction, the executive instructions including information on a register;

C) instruction scheduling means for rearranging the executive instructions according to information included in the executive instructions on areas that are parts of an area in the register so that a plurality of executive instructions that are to be executed in parallel are adjacent to each other; and D) object code generating means for generating the object codes according to the rearranged executive instructions.

16. The compiling apparatus according to claim 15, wherein the instruction scheduling means includes:

A) a dependency relation analysis unit for generating dependency relation information that indicates dependency relations between the executive instructions according to order in which the executive instructions are arranged and the information on the areas that are parts of the area in the register;

B) an instruction rearrangement unit for determining groups containing at least one instructions that are to be executed in parallel according to the dependency relation information and rearranging the executive instructions; and C) an execution boundary adding unit for adding parallel execution information to each of the determined groups that indicates whether instructions are to be executed in parallel.

17. The compiling apparatus according to claim 16, wherein the dependency relation analysis unit includes:
   A) a reference storage resource table that includes a plurality of sets of a kind of executive instruction and areas that are parts of the area in the register, the areas in which an executive instruction of the kind refers to and stores data;
   B) a resource obtaining unit for obtaining the information on the areas that are the parts of the register from the reference storage resource table; and
   C) a dependency relation generating unit for generating the dependency relation information according to the order in which the executive instructions are arranged and the information on the areas that are the parts of the area in the register.

18. A compile program that is recorded on a computer-readable recording medium, the compile program being used by a compiling apparatus that includes storage means for storing a source program described in a high-level language, the compile program generating object codes from the source program,
   the compile program, comprising:
   A) an execution code generating step execution code generating means for reading the source program from the storage means and performing translation processing on the read source program to generate an executive program, the executive program including at least one executive instruction, the executive instructions including information on a register;
   B) an instruction scheduling step for rearranging the executive instructions according to information included in the executive instructions on areas that are parts of an area in the register so that a plurality of executive instructions that are to be executed in parallel are adjacent to each other; and
   C) an object code generating step for generating the object codes according to the rearranged executive instructions.

19. The compile program according to claim 18, wherein the instruction scheduling step includes:
   A) a dependency relation analysis substep for generating dependency relation information that indicates dependency relations between the executive instructions according to order in which the executive instructions are arranged and the information on the areas that are parts of the area in the register;
   B) an instruction rearrangement substep determining groups containing at least one instructions that are to be executed in parallel according to the dependency relation information and rearranging the executive instructions; and
   C) an execution boundary adding substep for adding parallel execution information to each of the determined groups that indicates whether instructions are to be executed in parallel.

20. The compile program according to claim 19, wherein the compiling apparatus includes
   a reference storage resource table that includes a plurality of sets of a kind of executive instruction and areas that are parts of the area in the register, the areas in which an executive instruction of the kind refers to and stores data, and
   wherein the dependency relation analysis substep includes:
   a) a resource obtaining substep for obtaining the information on the areas that are the parts of the register from the reference storage resource table; and
   b) a dependency relation generating substep for generating the dependency relation information according to the order in which the executive instructions are arranged and the information on the areas that are the parts of the area in the register.

* * * * *